(12) United States Patent
Asada et al.

(10) Patent No.: US 9,479,883 B2
(45) Date of Patent: *Oct. 25, 2016

(54) AUDIO SIGNAL PROCESSING APPARATUS, AUDIO SIGNAL PROCESSING METHOD, AND PROGRAM

(71) Applicant: Sony Corporation, Tokyo (JP)

(72) Inventors: Kohei Asada, Kanagawa (JP); Yuji Kitazawa, Saitama (JP)

(73) Assignee: Sony Corporation, Tokyo (JP)

( * ) Notice: Subject to any disclaimer, the term of this patent is extended or adjusted under 35 U.S.C. 154(b) by 238 days.

This patent is subject to a terminal disclaimer.

(21) Appl. No.: 14/062,639

(22) Filed: Oct. 24, 2013

(65) Prior Publication Data

US 2014/0050327 A1 Feb. 20, 2014

Related U.S. Application Data

(63) Continuation of application No. 13/069,561, filed on Mar. 23, 2011, now Pat. No. 8,634,565.

(30) Foreign Application Priority Data

Apr. 7, 2010 (JP) ................ 2010-088659

(51) Int. Cl.
*H04R 29/00* (2006.01)
*G06F 1/16* (2006.01)
*H04R 1/10* (2006.01)

(52) U.S. Cl.
CPC ............ *H04R 29/00* (2013.01); *G06F 1/1626* (2013.01); *H04R 1/1041* (2013.01); *G06F 2200/1636* (2013.01); *H04R 2225/61* (2013.01)

(58) Field of Classification Search
CPC ...... H04R 29/00; H04R 3/00; H04R 1/1041; G06F 2200/1636
USPC .................................... 381/56, 58, 122, 312
See application file for complete search history.

(56) References Cited

U.S. PATENT DOCUMENTS 8,634,565 B2   1/2014   Asada et al.
8,699,718 B2   4/2014   Kitazawa et al.
(Continued)

FOREIGN PATENT DOCUMENTS

CN   1928781 A     3/2007
DE   10145994 A1   4/2003
(Continued)

OTHER PUBLICATIONS

U.S. Appl. No. 13/115,224, filed May 25, 2011, Kitazawa et al.
U.S. Appl. No. 13/115,233, filed May 25, 2011, Kitazawa et al.

*Primary Examiner* — Alexander Jamal
(74) *Attorney, Agent, or Firm* — Chip Law Group

(57) ABSTRACT

An audio signal processing apparatus includes a tapping detection unit to which an audio signal picked up by a microphone is input and that detects a tapping input operation on the basis of an energy increase/decrease determination process for making a determination as to whether an increase and a decrease of an energy level of low-frequency components of the audio signal occur within a first time period; and a control unit that performs a certain control process that is set for a tapping input operation in response to a tapping input operation being detected by the tapping detection unit.

15 Claims, 16 Drawing Sheets

(56) References Cited

U.S. PATENT DOCUMENTS

| | | | |
|---|---|---|---|
| 2006/0211499 A1 | 9/2006 | Bengtsson et al. | |
| 2007/0079206 A1* | 4/2007 | Arora et al. | 714/745 |
| 2008/0159568 A1* | 7/2008 | Asada et al. | 381/150 |
| 2008/0234842 A1* | 9/2008 | Zhang | 700/83 |
| 2008/0317261 A1 | 12/2008 | Yoshida et al. | |
| 2009/0046868 A1 | 2/2009 | Engle et al. | |
| 2011/0087454 A1* | 4/2011 | Lee et al. | 702/124 |
| 2011/0249824 A1 | 10/2011 | Asada et al. | |
| 2011/0293102 A1 | 12/2011 | Kitazawa et al. | |
| 2011/0293107 A1 | 12/2011 | Kitazawa et al. | |
| 2014/0177851 A1 | 6/2014 | Kitazawa et al. | |

FOREIGN PATENT DOCUMENTS

| | | |
|---|---|---|
| EP | 1762926 A2 | 3/2007 |
| JP | 2001-154692 A | 6/2001 |
| JP | 2003-143683 A | 5/2003 |
| JP | 2007-019787 A | 1/2007 |
| JP | 2007-081560 A | 3/2007 |
| JP | 2008-166897 A | 7/2008 |
| WO | WO 2006/036262 A2 | 4/2006 |
| WO | WO 2006/075275 A1 | 7/2006 |

\* cited by examiner

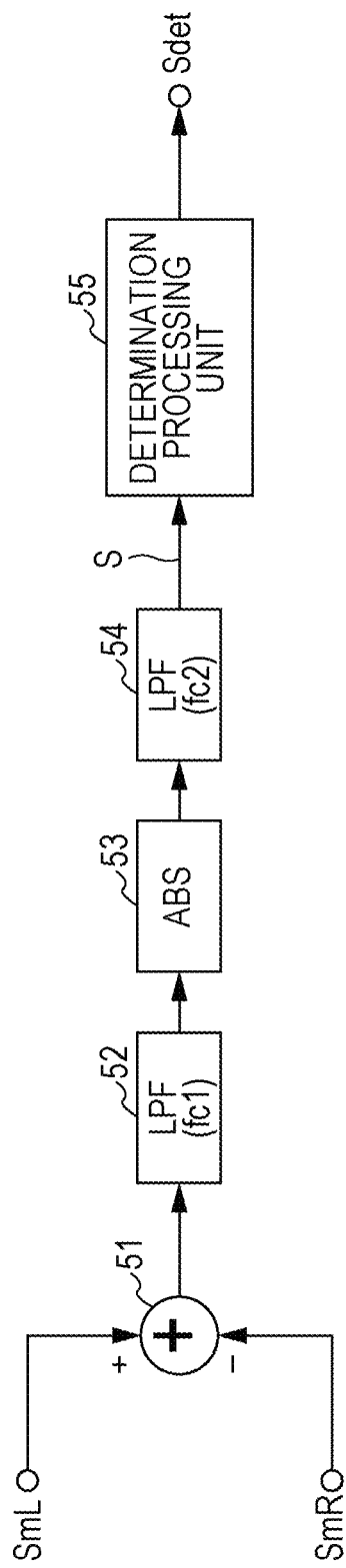

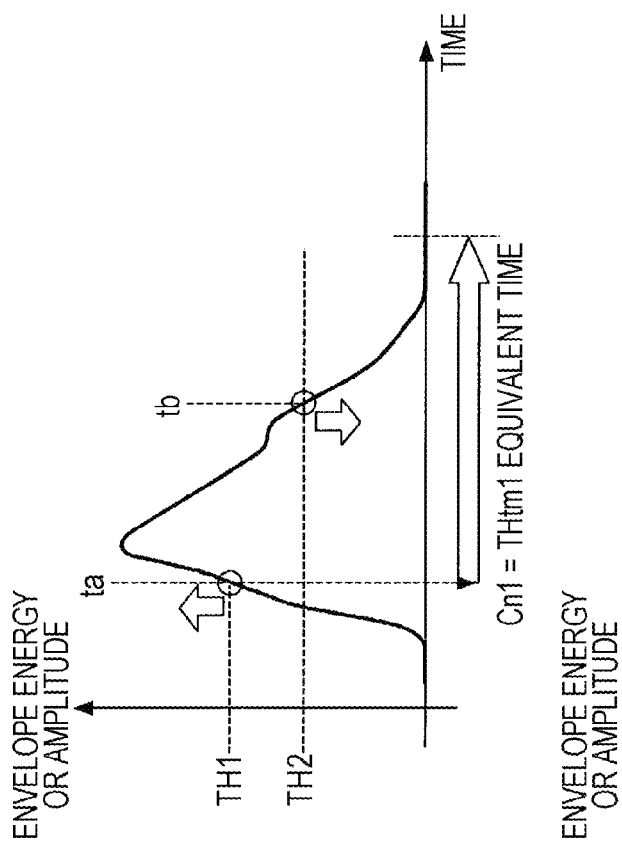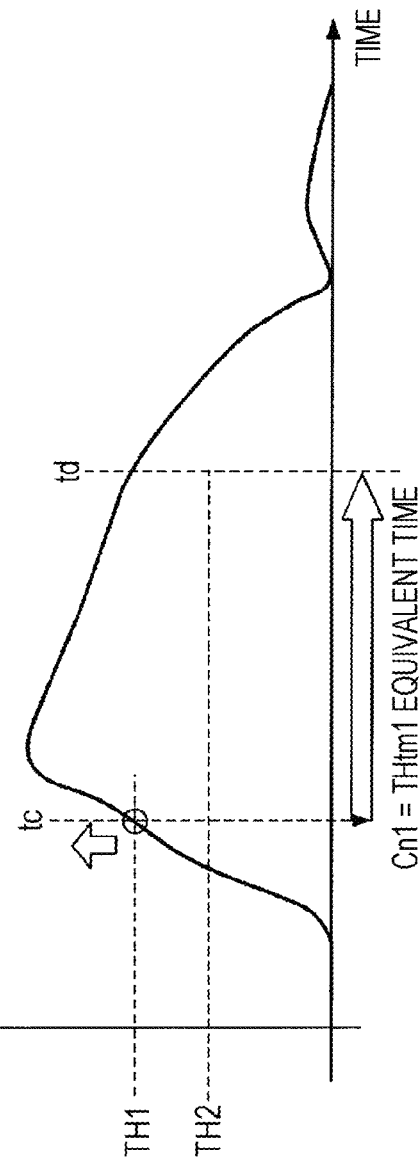
FIG. 8A
WHEN ONE TAP IS DETERMINED
FIG. 8B
WHEN ONE TAP IS NOT DETERMINED

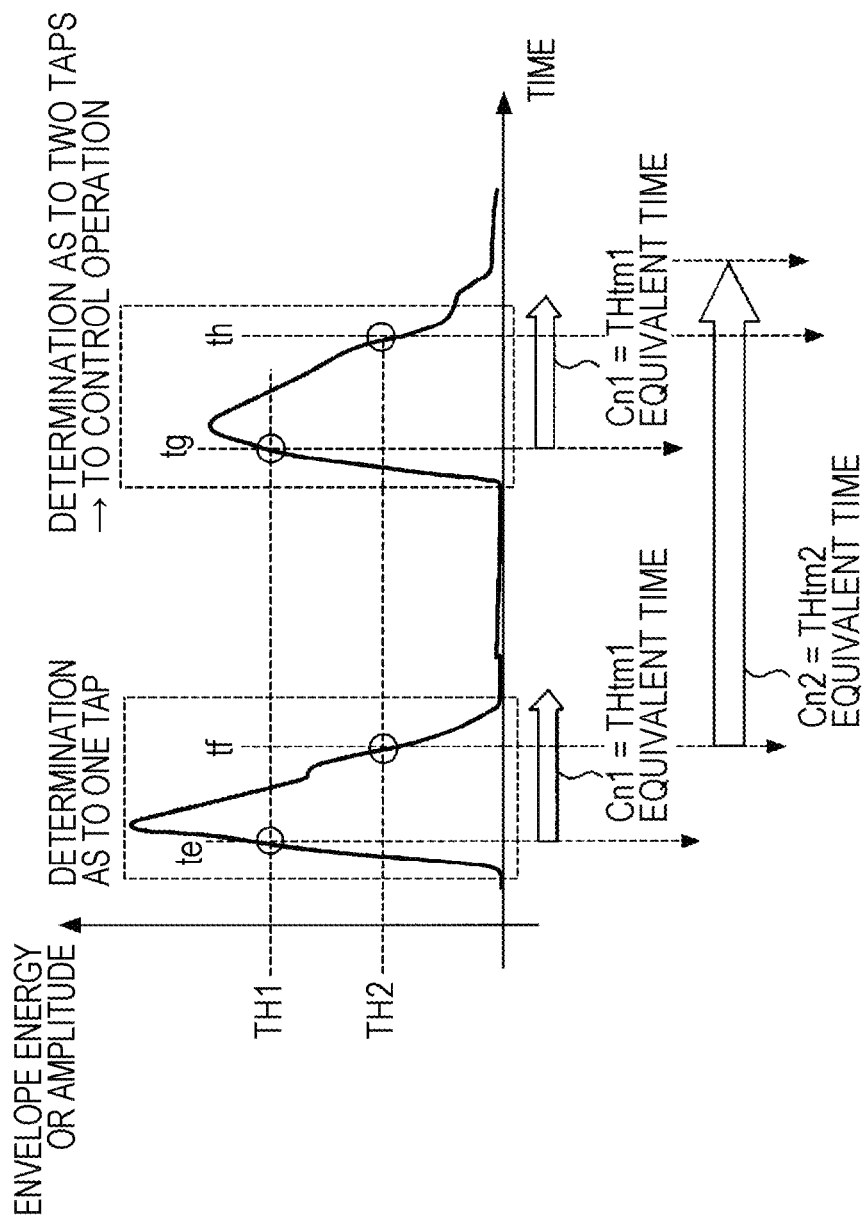

FIG. 15B

<SPECIAL CODE>
- DOUBLE TAPPING WITHIN 1 SECOND ... EACH SELECT MODE In OR MODE Out
- TRIPLE TAPPING WITHIN 1 SECOND ... PREVIOUS SELECTED ITEM

<SELECT MODE>

| TRANSMISSION DESTINATION SELECTION | | TEXT CONTENT SELECTION | | EXECUTION SELECTION | |
|---|---|---|---|---|---|
| 00 | (OPERATION COMPLETE) | 00 | (OPERATION COMPLETE) | 00 | (OPERATION COMPLETE) |
| 01 | Mr./Ms. A | 01 | CURRENTLY GOING TO WORK | 01 | TRANSMISSION |
| 02 | Mr./Ms. B | 02 | NOW RETURNING | 02 | REDO FROM TEXT CONTENT SELECTION |
| 03 | Mr./Ms. C | 03 | I'LL BE LATE TODAY | 03 | REDO FROM TRANSMISSION DESTINATION SELECTION |
| 04 | Mr./Ms. D | 04 | EMERGENCY OCCURRED | 04 | CANCEL ALL OPERATIONS |
| 05 | ... | 05 | ... | 05 | ... |

FIG. 15A

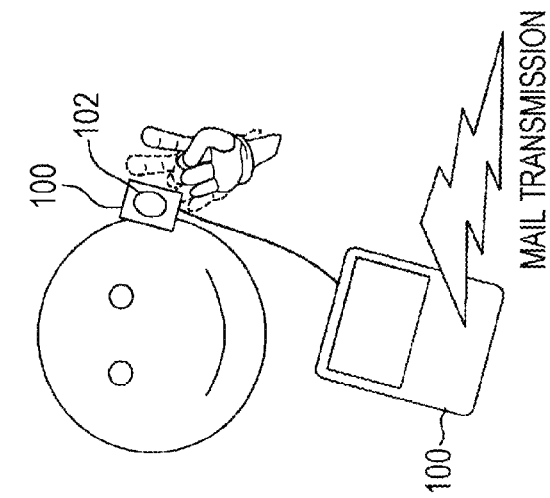

MAIL TRANSMISSION

AUDIO SIGNAL PROCESSING APPARATUS, AUDIO SIGNAL PROCESSING METHOD, AND PROGRAM

RELATED APPLICATIONS

This application is a continuation of U.S. application Ser. No. 13/069,561, filed on Mar. 23, 2011, which claims the benefit of Japanese Application Serial No. 2010-088659, filed on Apr. 7, 2010, each of which is incorporated by reference in its entirety.

BACKGROUND OF THE INVENTION

1. Field of the Invention

The present invention relates to an audio signal processing apparatus that detects an operation input of a user by using an audio signal picked up by a microphone, and to an audio signal processing method for use therewith. Furthermore, the present invention relates to a program for implementing such an audio signal processing apparatus and audio signal processing method.

2. Description of the Related Art

In various electronic apparatuses, as devices for inputting operations of a user, operation keys, a keyboard, a mouse, operation dials, a touch panel, and the like are used.

Usually, these operation devices are installed in correspondence with the functions of the electronic apparatuses. On the other hand, depending on the functions and usage of the electronic apparatuses, there has been a demand for making the number of operation keys as small as possible and making operations easier to perform and efficient.

In Japanese Unexamined Patent Application Publication No. 2008-166897, a technology in which a microphone is used as a device for inputting an operation is disclosed. In the technology disclosed in Japanese Unexamined Patent Application Publication No. 2008-166897, lightly tapping a microphone or a periphery thereof with a finger or the like is recognized as an operation input. For this reason, an audio signal waveform picked up by a microphone when a user performs tapping is recognized by a waveform correlation process.

SUMMARY OF THE INVENTION

As in Japanese Unexamined Patent Application Publication No. 2008-166897, since a microphone can also be used as an input device, this use contributes to a reduction in the number of operation keys of the apparatus housing and to improved ease of use.

For example, as an operation of a portable music player, a case in which a microphone is installed in a headphone portion mounted by the user is considered. The user usually keeps a portable music player in a clothes pocket, a bag, or the like. This is because it is not necessary to take out the portable music player all the way if a certain operation is possible by tapping a periphery of a microphone of the headphone portion.

However, in order to detect that audio signal components generated by tapping have been contained in the audio signal of the microphone input, frequency analysis, cross-correlation, and the like using FFT are necessary. This takes a lot of resources (number of calculations) of a central processing unit (CPU) or a digital signal processor (DSP) as a computation processing device, and the processing burden is large.

In particular, it is necessary that the process of detecting an operation input is constantly performed to deal with a nonregular user operation. In order to constantly perform a process with a lot of calculations, a computation processing device with high performance is necessary.

This does not pose a big problem for a high-performance electronic apparatus. However, in an apparatus for which a comparatively lower cost is strongly demanded, such as the above-mentioned portable music player, a large number of calculations is undesirable because it becomes a factor in increasing the cost of the music player.

Furthermore, because there are a large number of calculations for detecting an operation, the time until the operation is recognized becomes long, and consequently the long time becomes disadvantageous for achieving device operation with a satisfactory response.

Accordingly, it is desirable to perform all processes and determinations by time axis signal processing, decrease the number of calculations, and shorten the time until detection at the same time in a case where an operation input is to be detected from an audio signal of a microphone input caused by tapping performed by a user.

According to an embodiment of the present invention, there is provided an audio signal processing apparatus including: a tapping detection unit to which an audio signal picked up by a microphone is input and that detects a tapping input operation on the basis of an energy increase/decrease determination process for making a determination as to an increase and a decrease of an energy level of low-frequency components of the audio signal within a first time period; and a control unit that performs a certain control process that is set for a tapping input operation in response to a tapping input operation being detected by the tapping detection unit. The tapping detection unit detects that a tapping input operation has been performed in a case where the detection of the increase and the decrease of the energy level in the energy increase/decrease determination process within the first time period occurs a plurality of times within a second time period longer than the first time period.

Furthermore, audio signals of a plurality of channels may be input to the tapping detection unit, and the tapping detection unit may perform the energy increase/decrease determination process on an audio signal on which audio signals of a plurality of channels are added. Alternatively, audio signals of a plurality of channels may be input to the tapping detection unit, and the tapping detection unit may perform the energy increase/decrease determination process on each of the audio signals of the plurality of channels, and may detect a tapping input operation on each channel.

Alternatively, audio signals of a plurality of channels may be input to the tapping detection unit, and the tapping detection unit may perform a channel determination process for making a determination as to whether a channel contains tapping sound among the audio signals of the plurality of channels and the energy increase/decrease determination process with regard to an audio signal in which the audio signals of the plurality of channels are added or subtracted, and may detect the channel in which the detection of the tapping input operation and the tapping input operation have been performed.

Furthermore, in the energy increase/decrease determination process, it may be determined whether or not the energy level of the low-frequency components of the audio signal has increased to more than a first threshold value and thereafter the energy level has decreased to less than a second threshold value within the first time period.

Furthermore, the audio signal processing apparatus may further include a microphone, wherein the audio signal picked up by the microphone is input to the tapping detection unit.

According to another embodiment of the present invention, there is provided an audio signal processing method including the step of: detecting a tapping input operation on the basis of an energy increase/decrease determination process for making a determination as to an increase or a decrease of an energy level of low-frequency components with regard to an audio signal picked up by a microphone within a first time period; and performing a certain control process that is set for a tapping input operation in response to a tapping input operation being detected in the tapping detection step.

According to another embodiment of the present invention, there is provided a program for causing a computation processing device to perform: a tapping detection step; and a control step.

In the present invention such as that described above, the energy level of low-frequency components regarding an audio signal picked up by the integral or separate microphones is monitored. Then, it is determined that a tap has occurred in the case where the energy level has increased or decreased within a first time period.

In particular, it is also preferable that it be determined that a tap input operation has occurred in the case where a plurality of taps are detected within a second time period.

In the case where a tap has occurred, the energy level (amplitude) of low-frequency components of a microphone input signal increases. Therefore, it becomes possible to detect a tap simply and easily without performing waveform analysis by monitoring the energy of low-frequency components of an audio signal.

According to an embodiment of the present invention, it is possible to detect a user operation performed by tapping on the basis of a microphone input audio signal by a simplified process. Consequently, it is possible to reduce a processing burden for detecting operation and reduce cost as a result of the reduction.

Furthermore, the simplified process allows the operation detection time period to be shortened, and a device operation with a satisfactory response becomes possible.

BRIEF DESCRIPTION OF THE DRAWINGS

FIG. 5 is a block diagram of a configuration example I of a tapping detection unit of the embodiment;

FIGS. 8A and 8B are illustrations of tapping determination of the tapping detection unit of the embodiment;

FIG. 9 is an illustration of operation input detection of the tapping detection unit of the embodiment;

FIGS. 15A and 15B are illustrations of an example of an electronic mail operation of the embodiment.

DESCRIPTION OF THE PREFERRED EMBODIMENTS

Hereinafter, embodiments of the present invention will be described in the following order.
1. Basic configuration and processing
2. Embodiment applied to NC headphone
   2-1: Configuration of NC headphone
   2-2: Tap detection unit (configuration example I)
   2-3: Tap detection unit (configuration example II)
   2-4: Tap detection unit (configuration example III)
   2-5: Modification of process of tapping detection unit
3. Embodiment applied to various apparatuses
4. Program
1. Basic Configuration and Processing First, the basic configuration as an embodiment of the present invention will be described.

The present invention assumes a system in which, originally, a microphone (hereinafter abbreviated as a "mic") device that is disposed in an apparatus and used for the purpose of picking up sound is used as a sensor for inputting various operations for controlling the function of the apparatus. Then, lightly tapping (in this specification, this action will be referred to as "tapping") a mic or the periphery thereof is recognized as an operation input of a user. The present invention relates to a detection algorithm for operation input by this tapping. In particular, in the detection algorithm of the present invention, frequency axis analysis such as that used in the related art is not performed, and processing is performed with regard to only the time axis. Thus, processing resources are decreased, and a detection effect is obtained.

The embodiment to be described below takes the form of any of various electronic apparatuses in which an audio signal processing apparatus that adopts such a detection algorithm of the present invention and recognizes operation input is installed.

Figure 1:
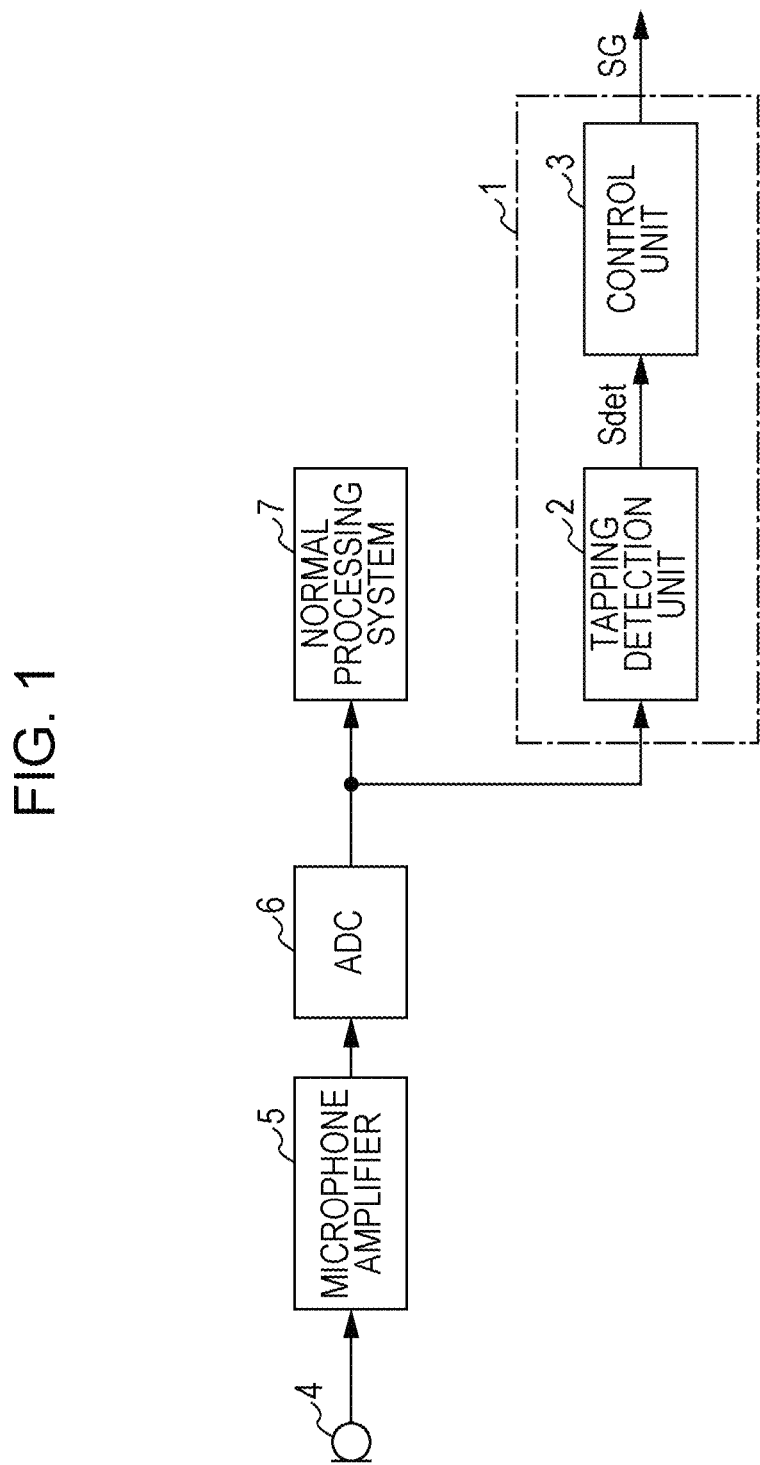
FIG. 1 is a block diagram of the basic configuration of an embodiment of the present invention.

FIG. 1 illustrates the basic configuration of the embodiment.

In FIG. 1, an audio signal processing unit 1, a mic 4, a mic amplifier 5, an A/D conversion unit 6, and a normal processing system 7 are illustrated.

The audio signal processing unit 1 includes a tapping detection unit 2 and a control unit 3. The audio signal processing unit 1 corresponds to the audio signal processing apparatus of the present invention. The audio signal processing unit 1 is constituted by, for example, a CPU, a DSP, and the like.

The audio signal that is picked up by the mic 4 is amplified by the mic amplifier 5 and is thereafter subjected to analog-to-digital conversion by the A/D conversion unit 6. Then, the audio signal formed as a digital signal is input to the normal processing system 7 and the audio signal processing unit 1.

The normal processing system 7 referred to herein indicates a processing unit of usual functions with respect to an audio signal in the electronic apparatus to which the audio signal from the mic 4 is input.

In consumer electronic apparatuses, the mic 4 has already been provided for various purposes. Alternatively, a separate mic 4 can be connected.

Examples thereof include a mobile phone, a digital camera having a sound recording function as well as an image recording function, an IC recorder, an information processing device, such as a personal computer, having an audio communication function, a mobile device, and a noise cancellation headphone (hereinafter referred to as an "NC headphone").

Each of these various types of electronic apparatuses is installed with a processing system corresponding to a function with regard to a mic input audio signal.

For example, in the case of an apparatus having a function of recording sound into a recording medium, parts that perform a compression process for sound recording, an encoding process for recording, and a recording process on a recording medium, or the like form the normal processing system 7 of FIG. 1.

Furthermore, in a communicable device, such as a mobile phone, in the case of the communicable device having a function of transmitting an audio signal, parts for performing a compression process, an encoding process for transmission, a transmission process, and the like form the normal processing system 7 of FIG. 1.

In addition, in the case of an NC headphone described with reference to FIG. 3 and subsequent figures, the function portion that performs a noise cancellation process corresponds to the normal processing system 7.

In the normal processing system 7, processes corresponding to these functions are performed with regard to the input audio signal.

The audio signal processing unit 1 performs detection of a tapping with regard to an input audio signal so as to detect the operation input by the user.

First, the tapping detection unit 2 detects a tapping by the user with a process in only the time axis. Specifically, the tapping input operation is detected on the basis of an energy increase/decrease determination process that makes a determination as to an increase or a decrease of the energy level in the low-frequency components of the input audio signal within a first time period. That is, when there is an instantaneous increase/decrease of the energy level within the first time period, it is detected that the user has performed a tapping.

One tapping may be recognized as an operation input. In order that an unconscious tapping by the user, the handling of the mic 4, a collision of some object body with the mic 4, or the like is not erroneously recognized as an operation, a plurality of continuous taps may be detected as an operation input. That is, in an energy increase/decrease determination process, in a case where the detection of an increase and decrease of the energy level of the low-frequency components of the audio signal within the first time period occurs a plurality of times within a second time period longer than the first time period, it may be considered that a tapping input operation has been performed.

The tapping detection unit 2 detects one or more taps as an operation input, and outputs an operation detection signal Sdet to the control unit 3.

The control unit 3 includes at least a function of a control process in such a manner as to correspond to the user operation in the electronic apparatus. Then, when the control unit 3 recognizes in accordance with the operation detection signal Sdet that the tapping detection unit 2 has detected a tapping input operation, the control unit 3 performs a certain control process that is set with regard to the tapping input operation.

Since the control process differs depending on various electronic apparatuses, examples of the control process will be described in the description of a specific embodiment of the electronic apparatus. For example, in the case of an apparatus having a function of reproducing music data or the like, examples thereof include a reproduction function. In that case, an operation in which music reproduction control is performed by tapping the mic 4 by the user, and music reproduction is performed is realized.

The basic configuration of the embodiment of the present invention is as described above in FIG. 1. That is, the input audio signal from the mic 4 is input to the audio signal processing unit 1, and the audio signal processing unit 1 detects the user operation on the basis of the determination of the tapping. Then, in a case where it is detected that the operation input has occurred, a certain control process corresponding to the operation is performed.

Figure 2:
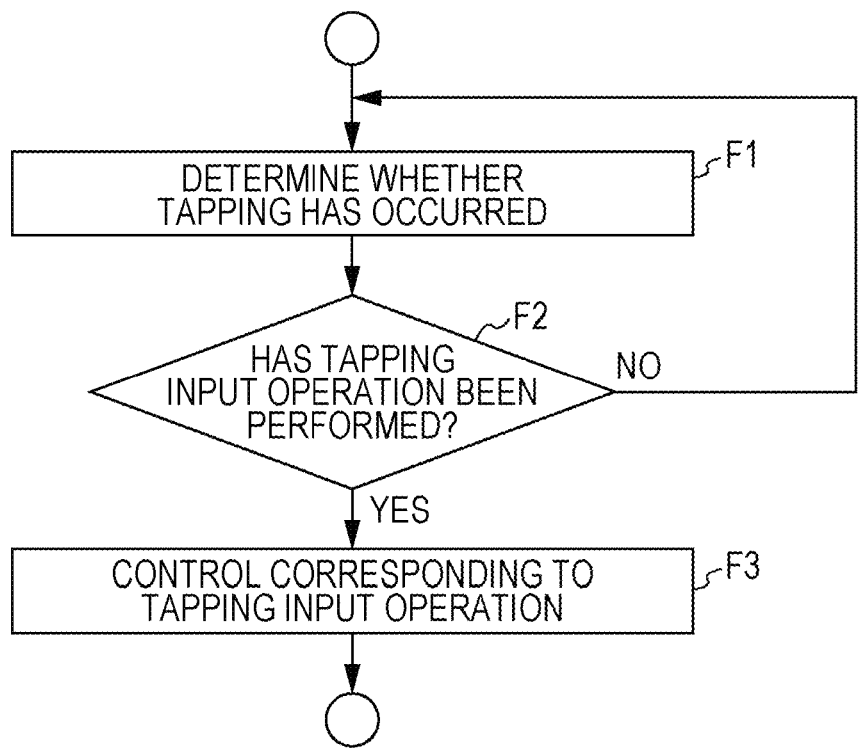
FIG. 2 is a flowchart of the basic process of the embodiment of the present invention.

FIG. 2 illustrates a basic process of the embodiment.

In the audio signal processing unit 1 to which a mic input audio signal is constantly input as in FIG. 1, a tapping determination is performed in step F1. That is, this is the process of the tapping detection unit 2. Then, in a case where it is determined that a tapping as an operation input by the user has occurred, the process proceeds to step F3 from step F2, and a control process corresponding to the operation input is performed. That is, this is the process of the control unit 3.

In the following, the embodiment will be described by giving an example of a noise cancellation headphone (NC headphone) as a specific example of the electronic apparatus.

Furthermore, other examples of the electronic apparatus will be described later.

2. Embodiment Applied to NC Headphone 2-1: Configuration of NC Headphone

Figure 3:
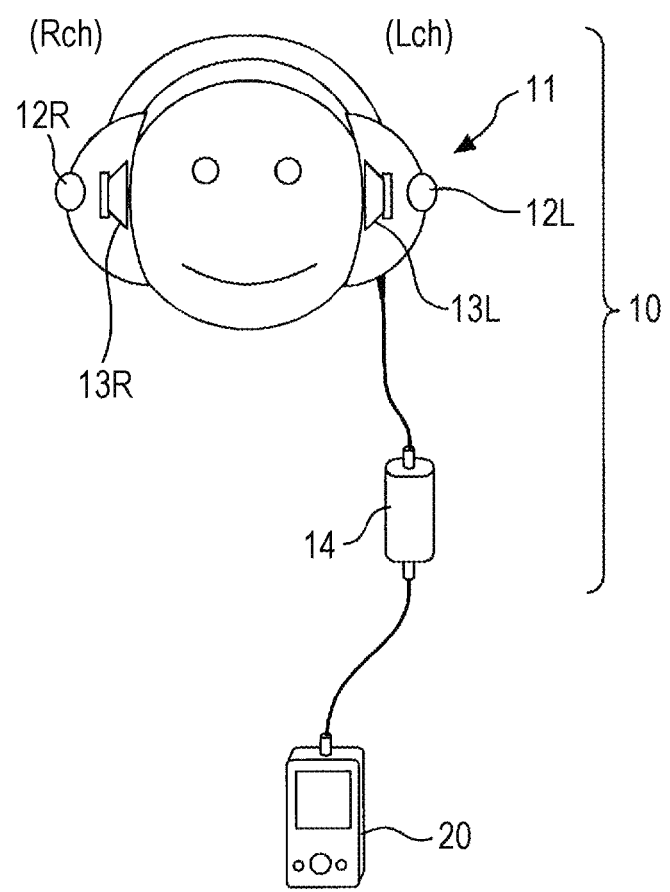
FIG. 3 is an illustration of an NC headphone of the embodiment.

FIG. 3 schematically illustrates an NC headphone 10 that is used by being connected to a music reproduction device, such as a portable medium player 20.

The medium player 20 reproduces data, such as music, which is recorded on an internal recording medium, and outputs 2-channel L and R audio signals to the connected NC headphone 10.

The NC headphone 10 is constituted by a headphone unit 11 and a noise cancellation unit 14.

The headphone unit 11 has speakers 13L and 13R of an L channel and an R channel in each of the speaker housings corresponding to right and left ears of a user. In the case of this example, a noise cancellation process of a so-called feed-forward method is performed, and mics 12L and 12R are provided to pick up sound of the right and left speaker housings.

The headphone unit 11 may be an earphone type or ear pad type rather than a type having a speaker housing as shown in the figure.

In the case of this example, it is sufficient that at any rate, the mics 12L and 12R are provided.

Furthermore, the headphone unit 11 is not limited to the NC headphone 10 that performs a noise cancellation process of a feed-forward method, and may be a type that performs a noise cancellation process of a feedback method.

The noise cancellation unit 14 is connected to the headphone unit 11 in which the mics 12L and 12R are provided in the manner described above.

The noise cancellation unit 14 mixes a noise reduction audio signal with an audio signal of reproduction music or the like, which is supplied from the medium player 20, thereby causing an audio signal in which external noise is reduced to be output from the speakers 13L and 13R.

When simply mentioned, noise reduction is performed in the following manner.

The mics 12L and 12R mounted in the speaker housing pick up external noise that reaches the ears of the user through the speaker housing. The noise cancellation unit 14 generates a noise reduction audio signal that is in a phase that is acoustically opposite to external noise on the basis of the audio signal of the external noise picked up by the mics 12L and 12R. Then, the generated noise reduction audio signal is combined with an audio signal of reproduction music or the like and is supplied to the speakers 13L and 13R.

Therefore, since the opposite phase components of external noise are contained in the audio output from the speakers 13L and 13R, the opposite phase components and the external noise that actually leaks in through the speaker housing are cancelled with each other in space. External noise components are reduced and the original output audio of reproduction music reaches the sense of hearing of the user.

Figure 4:
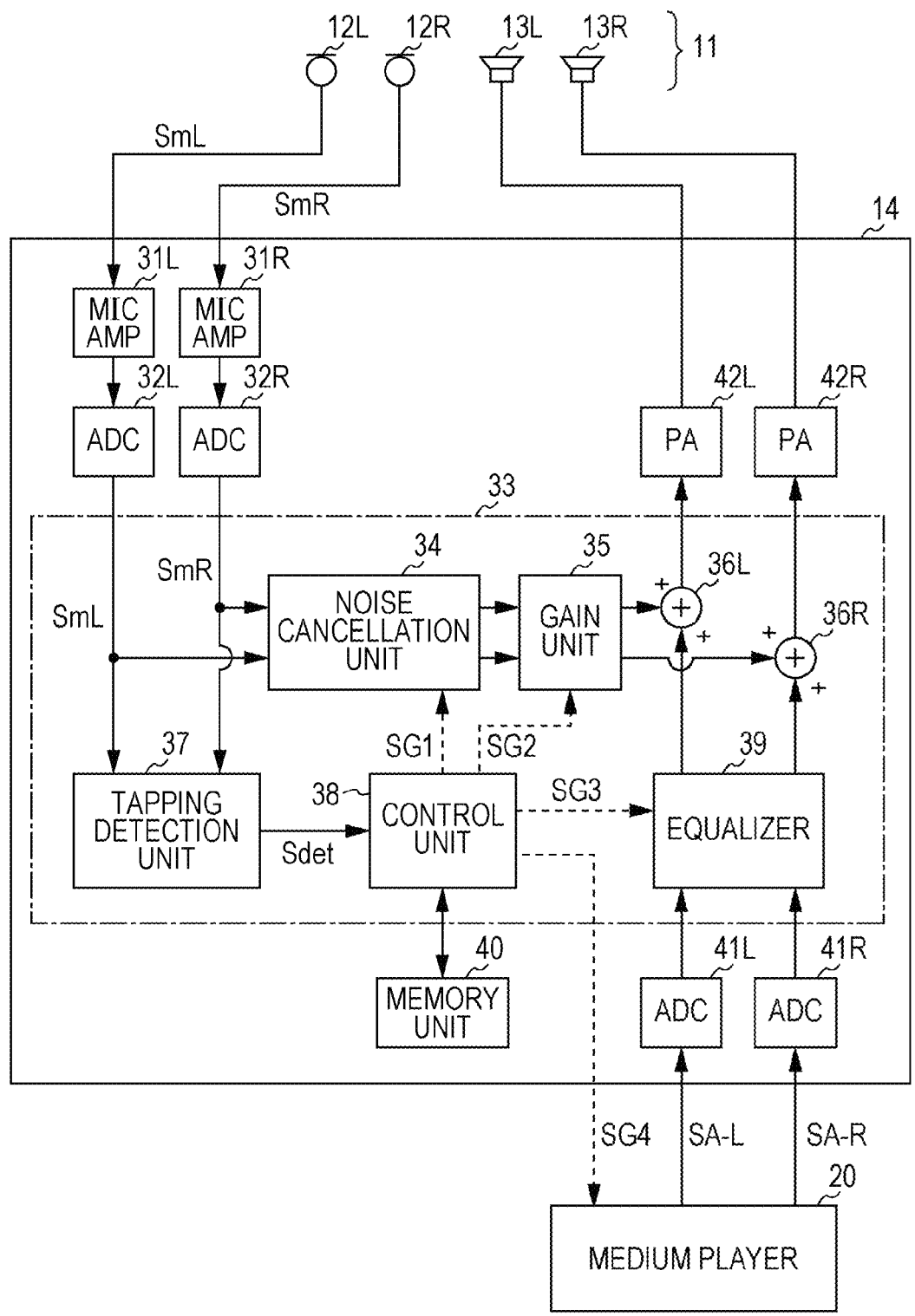
FIG. 4 is a block diagram of the NC headphone of the embodiment.

An example of the internal configuration of the noise cancellation unit 14 is shown in FIG. 4.

The noise cancellation unit 14 includes mic amplifiers 31L and 31R, A/D conversion units 32L and 32R, a main processing unit 33 using a DSP or a CPU, a memory unit 40, power amplifiers 42L and 42R, and A/D conversion units 41L and 41R.

The main processing unit 33 is provided with a noise cancellation unit 34, a gain unit 35, adders 36L and 36R, a tapping detection unit 37, a control unit 38, and an equalizer 39.

First, the audio signal of reproduction music or the like from the medium player 20 is processed in the following manner. Reproduced audio signals SA-L and SA-R of an L channel and an R channel as so-called headphone output are supplied from the medium player 20.

The reproduced audio signals SA-L and SA-R are converted into digital signals by the A/D conversion units 41L and 41R. Then, the equalizer 39 performs sound quality correction of amplitude-frequency characteristic correction, a phase-frequency characteristic correction, or both.

The correction process of the equalizer 39 is performed on the basis of a control signal SG3 from the control unit 38. For example, an indication of frequency characteristics is performed in accordance with the control signal SG3.

The reproduced audio signals SA-L and SA-R on which sound quality correction has been performed by the equalizer 39 are added with a noise reduction audio signal in the adders 36L and 36R, respectively, and are thereafter supplied to the power amplifiers 42L and 42R.

The power amplifiers 42L and 42R may be constituted by a digital amplifier or may be constituted by a D/A conversion unit and an analog amplifier.

Then, the outputs from the power amplifiers 42L and 42R are set as driving signals for the speakers 13L and 13R, and audio output based on the reproduced audio signals SA-L and SA-R are performed from the speakers 13L and 13R.

On the other hand, the above-mentioned noise cancellation process is performed in the following manner.

Audio signals SmL and SmR picked up by the mics 12L and 12R are amplified by the mic amplifiers 31L and 31R in the noise cancellation unit 14, and are thereafter converted into digital signals by the A/D conversion units 32L and 32R, respectively.

The digitized audio signals SmL and SmR that are output from the A/D conversion units 32L and 32R are supplied to the noise cancellation unit 34. For the noise cancellation unit 34, a digital filter that generates a noise reduction audio signal in the above-mentioned feed-forward method is used. The noise cancellation unit 34 performs a filtering process on each of the audio signals SmL and SmR by using a filter coefficient indicated by a control signal SG1 from the control unit 38, and generates noise reduction audio signals of the L channel and the R channel.

The generated noise reduction audio signals of the L channel and the R channel are supplied to the gain unit 35. The gain unit 35 provides a gain with respect to the noise reduction audio signals of the L channel and the R channel by using the gain coefficient indicated by the control signal SG2 from the control unit 38.

Then, the noise reduction audio signals of the L channel and the R channel from the gain unit 35 are added to the reproduced audio signals SA-L and SA-R, which are supplied to the adders 36L and 36R, respectively, in the manner described above.

As a result of the reproduced audio being output from the speakers 13L and 13R on the basis of such reproduced audio signals SA-L and SA-R in which the noise reduction audio signal is added, the noise reduction function such as that described above is exhibited.

The noise cancellation unit 14 of this example further includes a function of detecting a user operation performed by tapping the mics 12L and 12R or the periphery thereof.

The audio signals SmL and SmR picked up by the mics 12L and 12R are also supplied to the tapping detection unit 37.

The configuration and operation of the tapping detection unit 37 will be described later in detail. In the tapping detection unit 37, tapping of the mics 12L and 12R or the periphery thereof is detected with a process in only the time axis. Specifically, the tapping input operation is detected on the basis of the energy increase/decrease determination process for making a determination as to the increase and the decrease within the first time period of the energy level of the low-frequency components of the input audio signals SmL and SmR. Then, in particular, when tapping is performed continuously a plurality of times, this is detected as an operation input by the user, and an operation detection signal Sdet is output to the control unit 38.

The control unit 38 controls each unit of the noise cancellation unit 14 on the basis of the control signals SG1, SG2, and SG3. Furthermore, it is possible to transmit a control signal SG4 to the medium player 20.

In particular, in this example, the control unit 38 includes a function of performing a control process in correspondence with the tapping operation of the user. That is, when the control unit 38 recognizes in accordance with the operation detection signal Sdet that a tapping input operation is detected by the tapping detection unit 37, the control unit 38 performs a certain control process that is set with regard to the tapping input operation. For example, in response to the detection of the operation by the tapping input, operation input information is transmitted as a control signal SG4 to the medium player 20.

The memory unit 40 has stored therein information that is referred to by the control unit 38 in the control process. For example, in the memory unit 40, information on the filter coefficients in the noise cancellation unit 34 and the equalizer 39, and the like are stored.

In the present embodiment, the control unit 38 performs a certain control in response to the tapping input operation of the user. The following are assumed as examples of the control process.

First, as the control signal SG4, the transmission of operation input information to the medium player 20 is considered.

Examples thereof include control related to a reproduction operation of music or the like, such as reproduction/stop/sound recording/FF (fast forwarding)/REW (fast rewinding)

switching between reproduction and mute (or small sound volume reproduction)

switching between on/off of noise cancellation function switching between noise cancellation function on/monitor mode (ambient sound pickup, hearing aid operation)

volume up/down switching between voice phone conversation and music reproduction In a case where, for example, a tapping operation is set as an operation of "reproduction", the control unit 38 performs a process for transmitting a command of "reproduction" to the medium player 20 in a case where a tapping operation is detected by the tapping detection unit 37. The same applies to the other cases, and it depends on what kind of operation content has been assigned to a tapping operation.

Furthermore, as will be described later, in a case where the tapping of the mic 12L and the tapping of the mic 12R are distinguished from each other and detected, it is possible to assign two types of operation content. In that case, if, for example, the tapping of the mic 12L is assumed to be a volume up and the tapping of the mic 12R is assumed to be a volume down, the control unit 38 performs a process for transmitting a command of "volume up" or "volume down" to the medium player 20 in response to the detection of the tapping operation by the tapping detection unit 37.

Furthermore, the tapping can be distinguished in accordance with the number of continuous taps and can be set, or a variety of operations can be distinguished in accordance with the number of taps, the combination of the right and left mics 12L and 12R, and the like, and can be set. In that case, the control unit 38 transmits a certain command to the medium player 20 in response to the detection of those tapping operations.

In order to implement a noise cancellation function, it is necessary to dispose the mics 12L and 12R near a user's ears. For this reason, usually, the mics 12L and 12R are disposed near a user's ear. Then, for example, during commuting, even if the main body of the medium player 20 is not taken out, mere tapping of the mics 12L and 12R allows the operation of the medium player 20 to be controlled, which offers a lot of convenience.

Furthermore, an example in which the control unit 38 performs the internal control of the noise cancellation unit 14 in response to tapping detection is considered.

For example, the filter coefficients of the noise cancellation unit 34 may be switched under the control in accordance with the control signal SG1 in response to the tapping operation.

In general, the noise environment characteristics differ greatly depending on the location, for example, an airport, the platform of a station, in a train, or a factory even if the noise environment characteristics are observed using frequency characteristics. Therefore, for filter characteristics for noise reduction, it is originally desired that optimal filter characteristics appropriate for each noise environment characteristic be used. For this reason, it is useful for the user to switch and select most appropriate filter characteristics by tapping the mics 12L and 12R.

Furthermore, the control unit 38 may switch between gain coefficients of the gain unit 35 under the control based on the control signal SG2 in response to tapping detection. As a result, it is possible for the user to adjust as desired the level of the noise cancellation with an easy operation.

Furthermore, the control unit 38 may change the filter coefficient in the equalizer 39 under the control in accordance with the control signal SG3 in response to tapping detection. As a result, it is possible for the user to select a sound quality correction state with an easy operation. For example, various frequency characteristics are stored in the memory unit 40 as a preset, and equalizer characteristics that are the sound quality preferred by the user can be selected as desired with an easy tapping operation, which is useful.

2-2: Tapping Detection Unit (Configuration Example I)

Hereinafter, the configuration and operation of the tapping detection unit 37 will be described. Here, first, a configuration example I shown in FIG. 5 will be described.

Configuration example I is a configuration example in which a tapping is detected in common with regard to the audio signals SmL and SmR from the mics 12L and 12R.

The tapping detection unit 37 includes an adder 51, a low-pass filter 52, a conversion-to-absolute-value circuit 53, a low-pass filter 54, and a determination processing unit 55.

The audio signals SmL and SmR from the mics 12L and 12R are added by the adder 51 and are input to the low-pass filter 52. The cut-off frequency of the low-pass filter 52 is set at fc1. For example, it is set that fc1=100 Hz.

The low-frequency components with regard to the added signal of the audio signals SmL and SmR output from the low-pass filter 52 are converted into an absolute value by the conversion-to-absolute-value circuit 53.

The signal that is converted into an absolute value by the conversion-to-absolute-value circuit 53 is made to be a signal S indicating the energy level of the audio signals SmL and SmR through the low-pass filter 54 and is input to the determination processing unit 55. The cut-off frequency fc2 of the low-pass filter 54 is set at, for example, 50 Hz or the like.

In the determination processing unit, with regard to the signal S, the presence or absence of an operation input by tapping is detected in the energy increase/decrease determination process that will be described later. Then, as a result of the detection, an operation detection signal Sdet is output to the control unit 38.

Such operations of the tapping detection unit 37 will be described with reference to FIGS. 6A and 6B to FIG. 9.

Figure 6A:
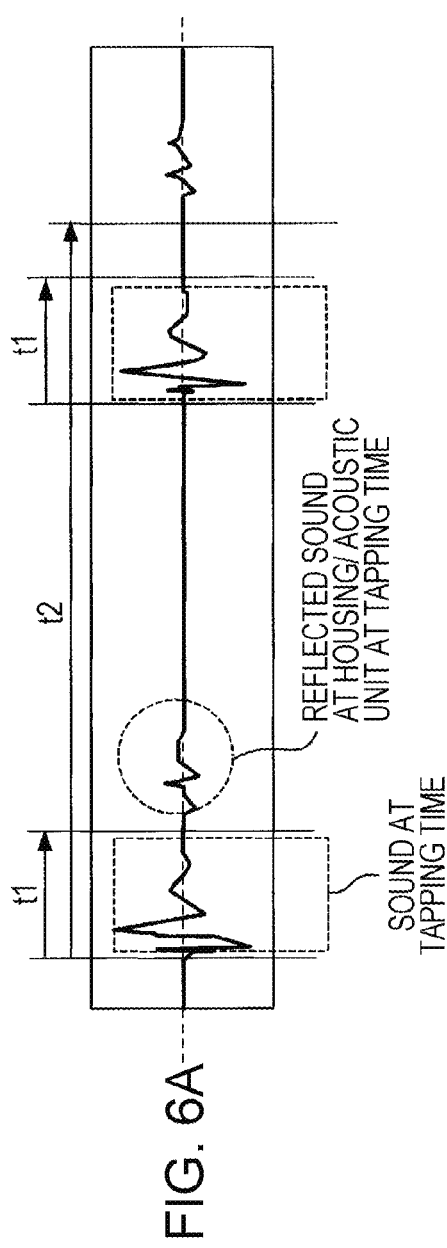
FIGS. 6A and 6B are illustrations of an audio signal that is input to the tapping detection unit of the embodiment.

FIG. 6A illustrates a waveform when a tapping occurs.

Here, time waveforms of the audio signals SmL and SmR as the outputs of the mics 12L and 12R when the peripheral portion of the mics 12L and 12R that are mounted in the headphone unit 11 are continuously tapped two times (double tapping) are shown.

A time period t1 is a time length of the waveform at the time of one tapping, and a time period t2 is a time length that is taken from when the first tapping starts (rise of waveform) until a second tapping is completed (convergence of waveform).

In practice, as can be seen from the figure, reflection occurred by the housing and the acoustic unit at the time of tapping, and a small waveform is seen a little later than the tapping reaction waveform.

Figure 6B:
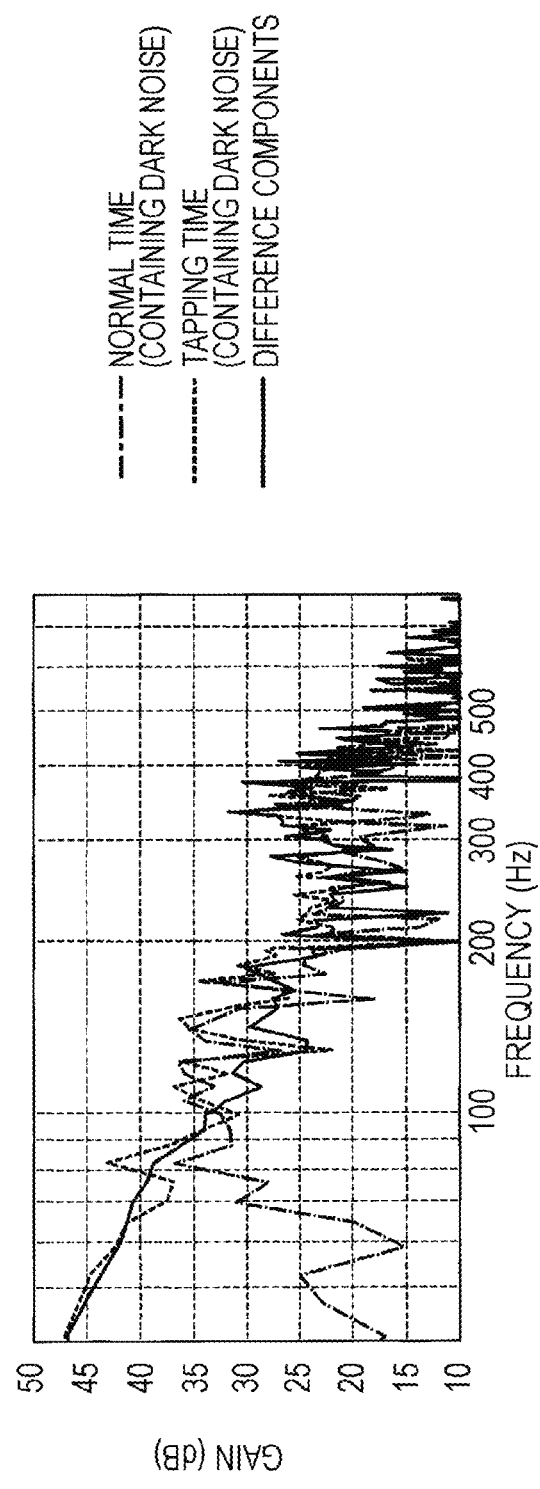

Here, the frequency characteristics of the response waveform (targeting the waveform of the t1 time period, excluding the waveform due to reflection) when one tapping is performed are as shown in FIG. 6B.

The short dashed line indicates a state in which dark noise at normal time is picked up, the dashed line indicates characteristics at tapping time, and the solid line indicates the difference components between the two.

As can be seen from the frequency characteristics, it is clear that the signal of low-frequency components (for example, lower than or equal to 100 Hz) is predominantly greatly picked up at tapping time. Thus, it is sufficient that the information herein is considered.

First, the low-pass filter 52 shown in FIG. 5 has a function of extracting such low-frequency components.

Then, since the output of the low-pass filter 52 is the low-frequency components, and is an amplitude having a positive/negative value, the negative amplitude is also converted into an absolute value by the conversion-to-absolute-value circuit 53 in order to make a determination as to the negative amplitude as the energy level. Then, the output is made to be a signal S as an envelope indicating the energy level by the low-pass filter 54.

Figure 7:
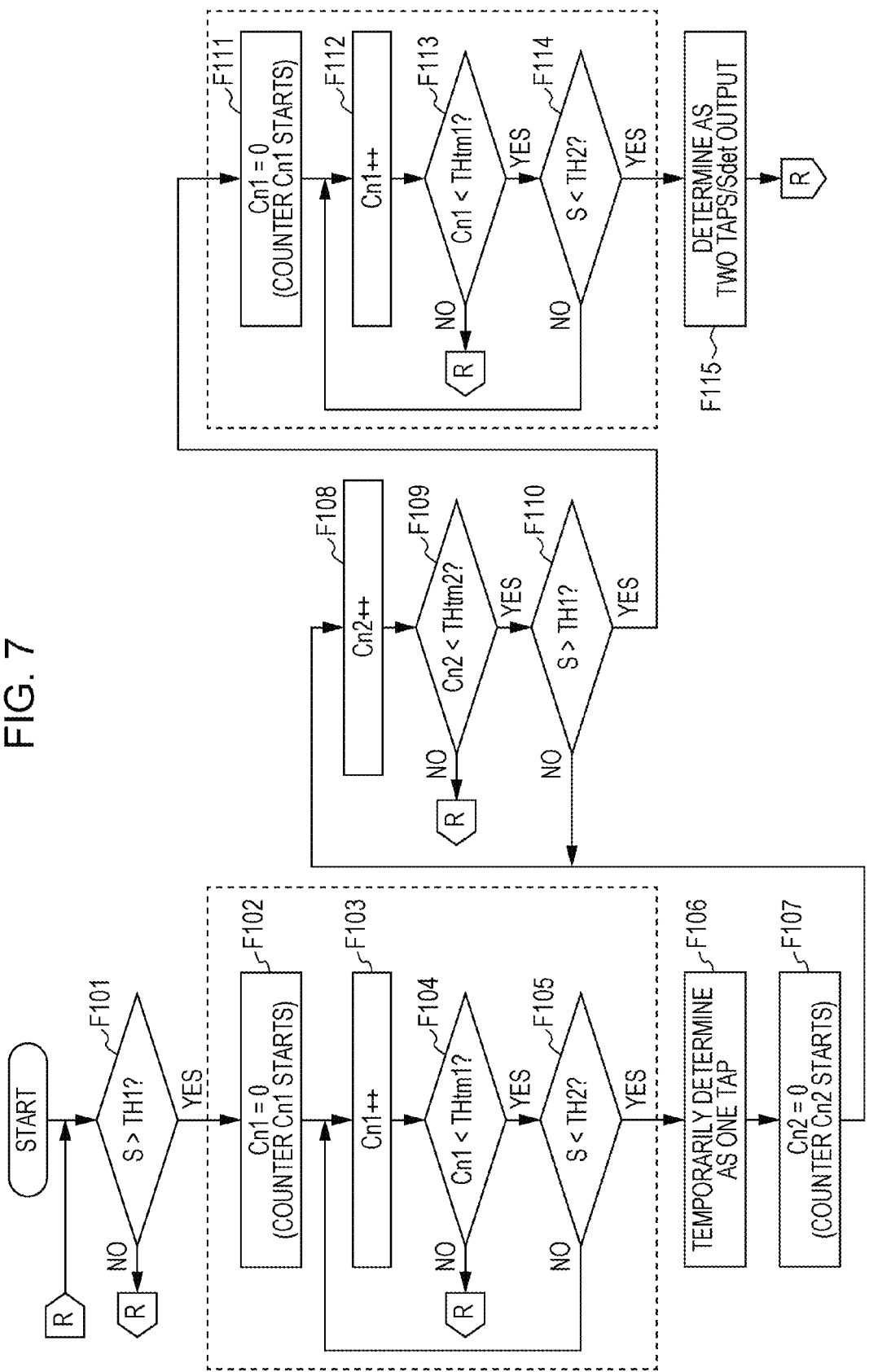
FIG. 7 is a flowchart of processing of the tapping detection unit of the embodiment.

FIG. 7 illustrates a flowchart of an energy increase/decrease determination process in which the determination processing unit 55 detects two continuous taps as an operation input of a user on the basis of the signal S.

The determination processing unit 55 performs an energy increase/decrease determination process of FIG. 7 on the input signal S.

First, in step F101, the determination processing unit 55 determines whether or not the level of the signal S is higher than a threshold value TH1.

FIGS. 8A and 8B and 9 illustrate the waveform of the signal S and threshold values TH1 and TH2. The threshold value TH1 is a threshold value that is used to determine whether or not the energy level of the signal S has increased. On the other hand, the threshold value TH2 is a threshold value that is used to determine whether or not the energy level of the signal S has decreased.

In step F101, the value of the signal S that is input is compared with the threshold value TH1 one after another. When the signal S is determined to be smaller than or equal to the threshold value TH1, the process returns to step F101, as indicated by "R", and the comparison of the input value of the next signal S with the threshold value TH1 is performed.

When the signal S exceeds the threshold value TH1, the determination processing unit 55 proceeds to step F102.

In step F102, first, the determination processing unit 55 resets a counter Cn1 to 0 and starts the counting.

Then, while the determination processing unit 55 increments the counter Cn1 in step F103, the determination processing unit 55 performs the determination of steps F104 and F105.

In step F104, the determination processing unit 55 determines whether or not the value of the counter Cn1 has not reached a first time period THtm1.

The first time period THtm1 is a certain time period shown in FIGS. 8A and 8B. This is set as a time period for determining whether or not the energy increase/decrease of the signal S has occurred instantaneously.

If the value of the counter Cn1 exceeds the first time period THtm1 in step F104, the process returns to step F101 as indicated by "R". That is, in that case, it is determined that the tapping is not tapping as an operation.

Furthermore, in step F105, the determination processing unit 55 determines whether or not the signal S has become smaller than the threshold value TH2.

When it is determined in step F105 that the signal S has become smaller than the threshold value TH2, the determination processing unit 55 proceeds to step F106, and temporarily determines that a first tapping as an operation has occurred.

As described earlier in FIG. 6A, the energy level of the waveform of the signal S at tapping time increases sharply, and thereafter the energy level decreases in a short time. In order to determine such a waveform change in the time axis, in step F104, the elapsed time period after the increase of the energy level has been detected is confirmed. That is, this is an elapsed time period at the point when it is not yet determined in step F105 that the energy level of the signal S has decreased.

This fact will be described with reference to FIGS. 8A and 8B.

FIG. 8A illustrates an example in a case where one tap has occurred.

In this case, the waveform (energy level envelope waveform) of the signal S rises sharply, and as a result of the waveform exceeding the threshold value TH1 at a point in time ta, it is determined in step F101 that the energy has increased.

At this point in time in step F102, the counting of the counter Cn1 starts.

In the case of FIG. 8A, at point in time tb, the energy level of the signal S has decreased to less than the threshold value TH2. This point in time tb is a point before the end of the first time period THtm1, which starts at the point in time ta. Therefore, at point in time tb, the process proceeds from step F105 to step F106, whereby the tapping is determined to be a first tapping.

That is, as a result of the increase and the decrease of the energy level being detected within the first time period THtm1, the tapping is determined to be a tapping as one operation.

On the other hand, FIG. 8B illustrates a case in which the tapping is not determined to be a tapping as an operation.

In this case, as a result of the waveform of the signal S exceeding the threshold value TH1 at point in time tc, it is determined in step F101 that the energy thereof has increased.

At this point in time, in step F102, the counting of the counter Cn1 is started.

In the case of FIG. 8B, after that, the energy level has not decreased suddenly.

Then, at point in time td at which the first time period THtm1 has passed after the point in time tc, the energy level of the signal S has not decreased to less than the threshold value TH2.

In this case, after the first time period THtm1 has passed, the process of FIG. 7 proceeds from step F104 to step F101.

That is, because the increase and the decrease of the energy level has not been detected within the first time period THtm1, it is determined that the increase and the decrease is not the increase of the energy level of the signal S as a result of tapping as an operation. For example, the increase and the decrease is regarded as an increase of the energy level due to other external noise or the like.

In the processes up to step F106 above, the determination processing unit 55 determines whether or not one tapping has occurred.

When it is determined in step F106 that a first tapping has occurred, the determination processing unit 55 resets the counter Cn2 to 0 in step F107, and causes the counting to start.

Then, while the determination processing unit 55 increments the counter Cn2 in step F108, the determination processing unit 55 performs the determination of steps F109 and F110.

In step F109, the determination processing unit 55 determines whether or not the value of the counter Cn2 has not reached a second time period THtm2.

The second time period THtm2 is a certain time period shown in FIG. 9. The second time period THtm2 is set to be a time period longer than the first time period THtm1 and is set as a time period for determining whether or not the tapping is two continuous taps.

If the value of the counter Cn2 exceeds the second time period THtm2 in step F109, the process returns to step F101. That is, in that case, it is determined that two continuous taps as an operation have not been performed.

Furthermore, in step F110, the determination processing unit 55 determines whether or not the signal S has become greater than the threshold value TH1.

This is a determination process as to whether or not the increase of the energy level of the signal S by the second tapping has been observed.

When it is determined in step F110 that the signal S has become greater than the threshold value TH1, the determination processing unit 55 performs the processes of steps F111 to F114.

The processes of steps F111 to F114 enclosed by the dashed line are the same processes (common routine) of steps F102 to F105 that are similarly enclosed by the dashed line.

In step F111, first, the determination processing unit 55 resets the counter Cn1 to 0, and causes the counting to start.

Then, while the determination processing unit 55 increments the counter Cn1 in step F112, the determination processing unit 55 performs the determination of steps F113 and F114.

In step F113, the determination processing unit 55 determines whether or not the value of the counter Cn1 has not reached the first time period THtm1.

The first time period THtm1 is set as a time period for determining whether or not the increase/decrease of the energy of the signal S has occurred instantaneously in the manner described above, that is, the increase/decrease is an instantaneous increase/decrease of the energy level due to the tapping operation. Therefore, when the value of the counter Cn1 exceeds the first time period THtm1 in step F113, the process returns to step F101 as indicated by "R". That is, in that case, it is determined that the tapping was not a tapping as an operation.

Furthermore, in step F114, the determination processing unit 55 determines whether or not the signal S has become smaller than the threshold value TH2.

When it is determined in step F114 that the signal S has become smaller than the threshold value TH2, the determination processing unit 55 proceeds to step F115, whereby it is determined that the second tapping as an operation has occurred.

A description will be given with reference to FIG. 9.

FIG. 9 illustrates a change in the energy level of the signal S in a case where two continuous taps have occurred.

In this case, when the waveform of the signal S exceeds the threshold value TH1 at point in time te, it is determined in step F101 that the energy has increased. At this point in time, in step F102, the counting of the counter Cn1 starts.

Then, at point in time tf, the energy level of the signal S is decreased to less than the threshold value TH2. This point in time tf is a point before the end of the first time period THtm1, which starts at point in time te. Therefore, at point in time tf, the process proceeds from step F105 to F106, whereby the tapping is determined to be a first tapping.

From the point in time tf, the counting of the counter Cn2 starts in step F107.

Then, at point in time tg, as a result of the waveform of the signal S exceeding the threshold value TH1 before the value of the counter Cn2 reaches the second time period THtm2, it is estimated in step F110 that the energy has increased due to the second tapping. At this point in time, the counting of the counter Cn1 starts in step F111.

Then, at point in time th, the energy level of the signal S has decreased to less than the threshold value TH2. This point in time th is a point before the end of the first time period THtm1, which starts at point in time tg. Therefore, at point in time tg, the process proceeds from step F114 to step F115, whereby it is determined that the second tapping has been performed.

The case in which it is determined in step F109 that the process is not a tapping operation and the process returns to step F101 is a case in which, after point in time tf, the increase of the second energy level is not detected even if the second time period THtm2 is reached.

Furthermore, the case in which it is determined in step F113 that the tapping is not a tapping operation and the process returns to step F101 is a case in which, after point in time tg, the decrease of the energy level is not detected even if the first time period THtm1 is reached. That is, this is a case in which the second increase of the energy level is as shown in FIG. 8B.

In a case where the process proceeds to step F115, the determination processing unit 55 determines that a double tapping as a conscious operation of the user has been performed. In that case, an operation detection signal Sdet indicating that an operation has occurred is output to the control unit 38.

The determination processing unit 55 performs the above energy increase/decrease determination process in the time axis as shown in FIG. 7, making it possible for the tapping detection unit 37 of this example to easily make a determination as to a tapping operation without causing an increase of resources.

In a case where a tap has occurred, the energy level (amplitude) of the low-frequency components of the microphone input signal increases. Accordingly, by monitoring the energy of the low-frequency components of the audio signal, waveform analysis or the like is not performed and a tapping is detected by the energy increase/decrease determination.

As a result, a reduction in the processing burden for detecting an operation and a reduction in cost are made possible. In particular, in a small apparatus with few resources like the noise cancellation unit 14 of the NC headphone 10, a necessary detection process becomes possible with simple and easy operations as described above, which is very effective.

Furthermore, it is constantly necessary to perform the process for detecting an operation input to deal with non-regular user operations. For this reason, since the process is a process with a small number of calculations as a signal processing in the time axis, the process is suitable as a process that is constantly performed.

Furthermore, since the process is a simple and easy process, the operation detection time period is shortened and device operation having a satisfactory response becomes possible.

Furthermore, in the case of this example, a determination as to two continuous taps (double tapping) is made by using the second time period THtm2 as a reference, and in the case where the double tap has occurred, the double tap is recognized as the operation of the user.

In addition, for the determination as to each of the first and confirmation taps, by using the first time period THtm1 as a reference, the instantaneous increase/decrease of the energy level of the signal S is confirmed.

That is, in the energy increase/decrease determination process of FIG. 7, in a case where the detection of the increase and the decrease of the energy level of the signal S within the first time period THtm1 occurs a plurality of times (two times in this example) within the second time period THtm2 that is longer than the first time period THtm1, the tapping detection unit 37 detects that a tapping input operation has been performed.

Therefore, first, when an increase of the energy level has occurred, it is not immediately determined that the tapping is a tapping operation, making it possible to avoid a situation where an increase in the energy level due to other external noise or the like is erroneously detected as tapping. For example, extrinsic noise, such as wind noise, the time during which the user continues to touch the mics 12L and 12R, can be prevented from being erroneously detected.

Furthermore, recognition of a double tapping as an operation excludes a case in which the user erroneously operates the mic 12L or 12R and the influence of extrinsic noise, and is useful to increase the detection accuracy when compared to the one tapping operation.

Furthermore, according to the configuration example I shown in FIG. 5, it is possible for the user to perform a tapping operation of either of the right and left mics 12L and 12R as desired.

For example, when one of the hands is occupied while having a bag, it becomes possible to easily perform a tapping operation by the free hand, thereby achieving ease of operation.

Then, in response to the tapping detection unit 37 detecting a tapping operation as described above, the control unit 38 performs control corresponding to the operation content assigned to the tapping operation, for example, the control shown earlier as an example.

If the control unit 38 is made to transmit a command for controlling the operation of the medium player 20, it is possible for the user to perform an operation while the medium player 20 is carried in a pocket or a bag during commuting.

Furthermore, since the operation is a process of tapping with a finger, it is possible to institutively control the medium player 20 or the noise cancellation unit 14.

Furthermore, since the operation is a method of tapping the mics 12L and 12R, if an ordinary (inexpensive) mic, and a signal processing unit of a CPU/DSP or the like are available, mounting is possible without using a special sensor, such as a touch sensor, which is useful for reducing the cost.

In addition, in the case of the NC headphone 10 of this example, the mics 12L and 12R are provided in the headphone unit 11 for the purpose of a noise cancellation function. Since an operation by a tapping is made possible using the mics 12L and 12R, it is not necessary to provide a new sensor device for the purpose of inputting an operation, the operation is suitable to reduce the cost in that point, and there is no increase of parts forming the device.

In the example of FIG. 5, the audio signals SmL and SmR from the mics 12L and 12R of the L and R channels are combined, and a determination as to a tapping operation is made. Alternatively, only the audio signal (for example, the audio signal SmL) of only one of the channels may be input to the low-pass filter 52. In that case, only the mic 12L of the channel is used for a tapping operation.

2-3: Tapping Detection Unit (Configuration Example II)

A tapping detection unit 37 as a configuration example II will be described with reference to FIG. 10.

The configuration example II is an example in which the L channel and the R channel, that is, the mics 12L and 12R, can be assigned to separate operations, respectively.

For example, the configuration example II is a configuration example in which the tapping of the mic 12L can be set as a volume up and the tapping of the mic 12R as a volume down.

Figure 10:
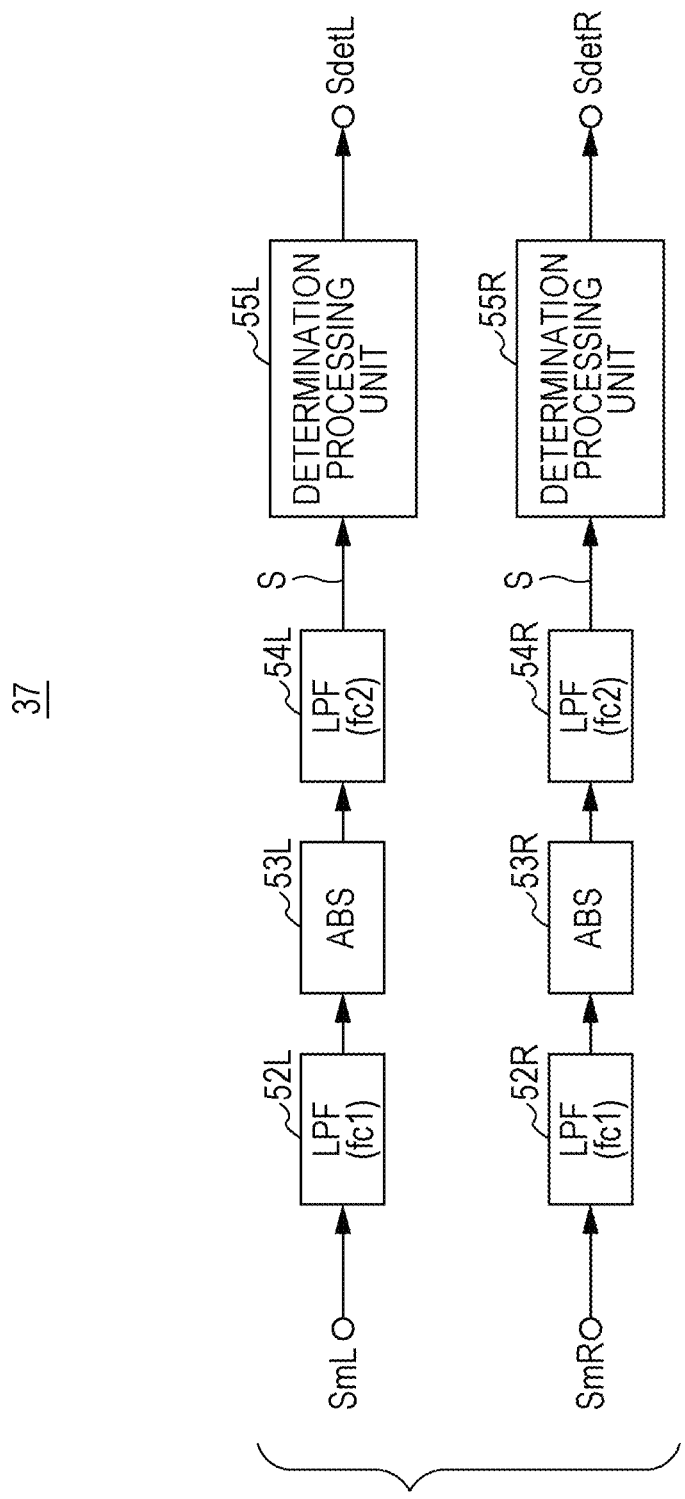
FIG. 10 is a block diagram of a configuration example II of the tapping detection unit of the embodiment.

As shown in FIG. 10, the tapping detection unit 37 adopts a tapping detection configuration of two independent systems using an L channel and an R channel.

That is, a low-pass filter 52L, a conversion-to-absolute-value circuit 53L, a low-pass filter 54L, and a determination processing unit 55L are provided for the audio signal SmL from the mic 12L. Furthermore, a low-pass filter 52R, a conversion-to-absolute-value circuit 53R, a low-pass filter 54R, and a determination processing unit 55R are provided for the audio signal SmR from the mic 12R.

The operations of the low-pass filters 52L and 52R, the conversion-to-absolute-value circuits 53L and 53R, and the low-pass filters 54L and 54R are the same as the operations of the low-pass filter 52, the conversion-to-absolute-value circuit 53, and the low-pass filter 54 of the configuration example I. Thus, repeated descriptions thereof are omitted.

Furthermore, it is sufficient that each of the determination processing units 55L and 55R performs, for example, an energy increase/decrease determination process as shown in FIG. 7.

Then, when the determination processing unit 55L detects a double tapping with regard to the signal S obtained from the audio signal SmL, the determination processing unit 55L outputs an operation detection signal SdetL to the control unit 38.

When the determination processing unit 55R detects a double tapping with regard to the signal S obtained from the audio signal SmR, the determination processing unit 55R outputs an operation detection signal SdetR to the control unit 38.

The control unit 38 is able to recognize two types of operation inputs on the basis of the operation detection signals SdetL and SdetR, and is able to control, for example, the volume up/down in response to those signals.

In accordance with the configuration example II, it is possible to separately perform two types of operations using the right and left mics 12L and 12R, which improves usability of the user.

2-4: Tapping Detection Unit (Configuration Example III)

Figure 11:
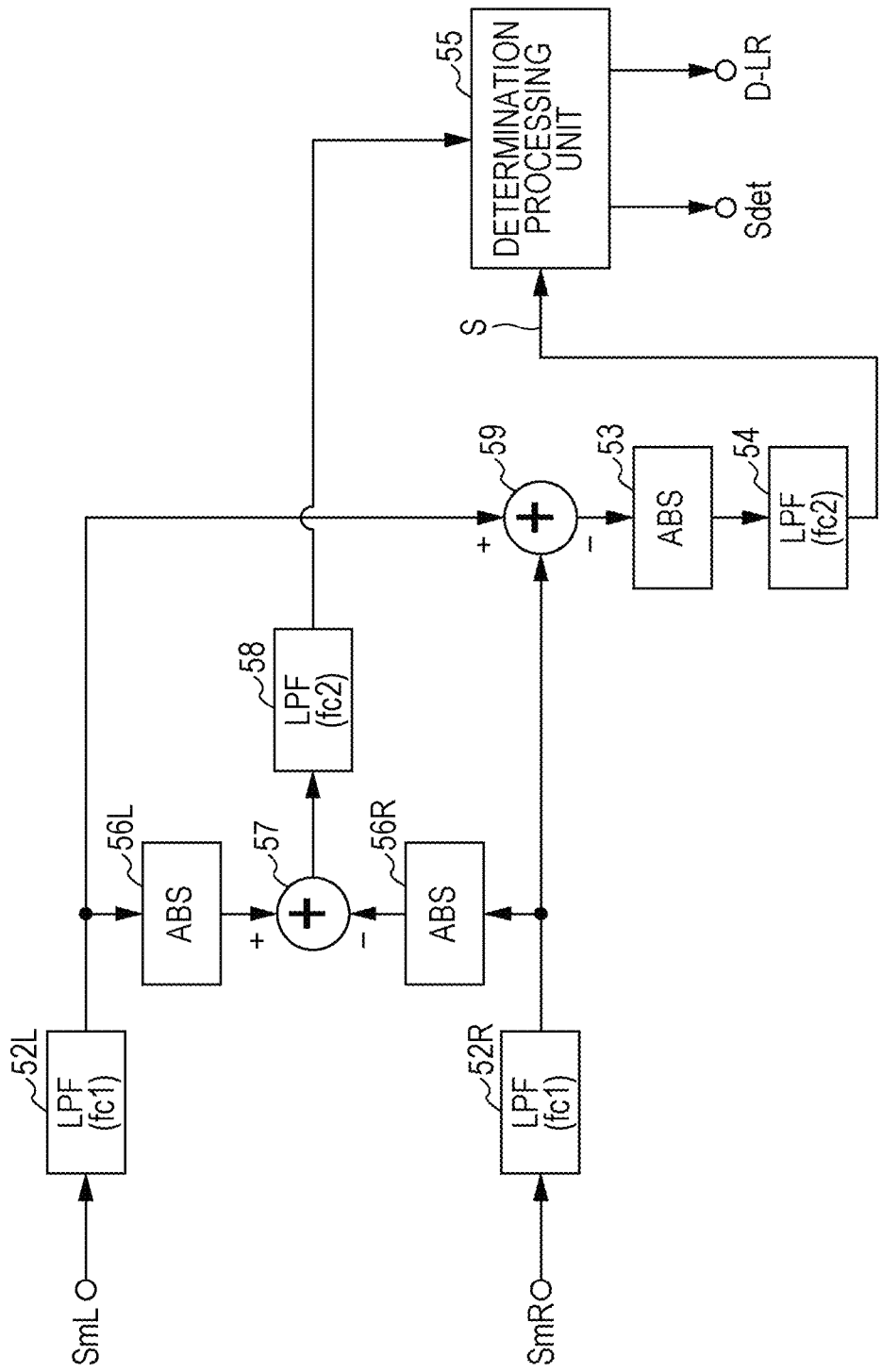
FIG. 11 is a block diagram of a configuration example III of a tapping detection unit of the embodiment.

Next, a configuration example III is shown in FIG. 11. Similarly to the configuration example II, the configuration example III is an example in which the L channel and the R channel, that is, the mics 12L and 12R, can be assigned to separate operations, respectively. In the case of the configuration example II, since the tapping detection unit 37 is simply installed with two tapping detection processing systems, the burden caused by the configuration is increased. The configuration example III is an example in which the burden caused by the configuration can be reduced.

In the configuration example III, the tapping detection unit 37 performs a channel determination process for making a determination as to whether the channel contains tapping sound between the audio signals SmL and SmR of a plurality of channels, and performs an energy increase/decrease determination process for an audio signal in which audio signals of a plurality of channels are added or subtracted. As a result, the detection of the tapping input operation and the detection of the channel in which the tapping input operation is performed are performed.

In this case, as shown in FIG. 11, the audio signal SmL from the mic 12L is input to the low-pass filter 52L, and the low-frequency components thereof are extracted at the cut-off frequency fc1.

Furthermore, the audio signal SmR from the mic 12R is input to the low-pass filter 52R, and the low-frequency components thereof are extracted at the cut-off frequency fc1.

The output of the low-pass filter 52L is supplied to the conversion-to-absolute-value circuit 56L and the subtractor 59.

Furthermore, the output of the low-pass filter 52R is supplied to the conversion-to-absolute-value circuit 56R and the subtractor 59.

The conversion-to-absolute-value circuit 56L converts the output of the low-pass filter 52L into an absolute value and supplies it to the subtractor 57. The conversion-to-absolute-value circuit 56R converts the output of the low-pass filter 52R into an absolute value and supplies it to the subtractor 57.

Therefore, for the output of the subtractor 57, a difference of the energy levels of the low-frequency components of the audio signals SmL and SmR of the right and left channels appears.

The output of the subtractor 57 is made to be an envelope signal in the low-pass filter 58 at the cut-off frequency fc2 and supplies the envelope signal to the determination processing unit 55.

In the determination processing unit 55, when a tapping is performed to one of the mics 12L and 12R, the positive and negative determination of the envelope signal makes it possible to detect which one of the mics 12L and 12R the tapping has been performed to.

A subtraction process is performed by the subtractor 59 on the low-frequency components of the audio signals SmL and SmR that are extracted by the low-pass filters 52L and 52R, and a difference value is extracted.

In a case where a tapping is performed on one of the mics 12L and 12R, the energy of the low-frequency components of the tapped audio signal increases. Therefore, for the output of the subtractor 59, the energy increase components due to the tapping appear.

The output of the subtractor 59 is converted into an absolute value by the conversion-to-absolute-value circuit 53, is made to be a signal S that is converted into an envelope by the low-pass filter 54 at a cut-off frequency fc2, and is supplied to the determination processing unit 55.

In the determination processing unit 55, an energy increase/decrease determination process is performed on the signal S. When a double tapping is detected with regard to the signal S, an operation detection signal Sdet and a determination signal D-LR of the L/R channel are output to the control unit 38.

Figure 12:
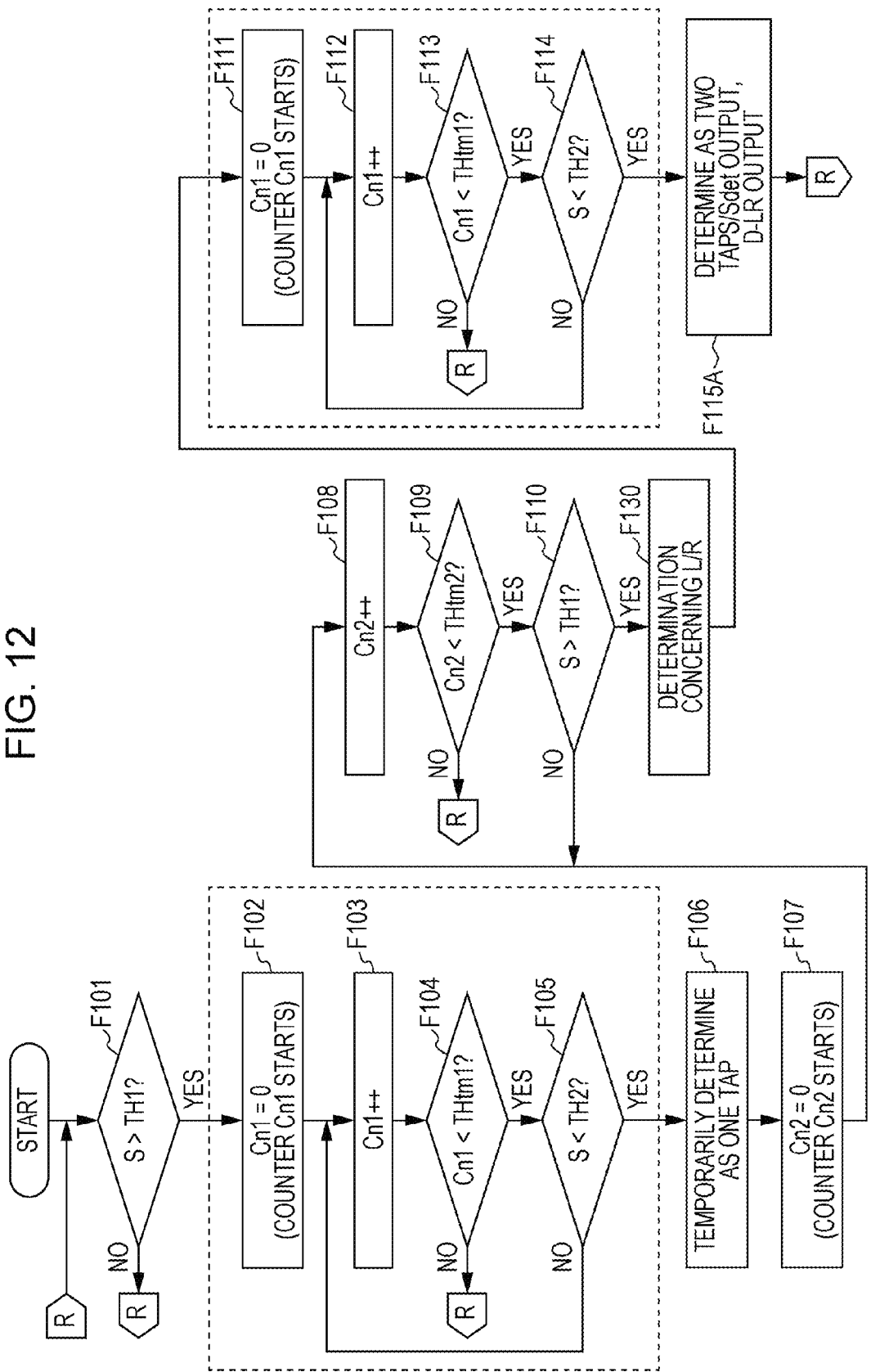
FIG. 12 is a flowchart of the process of the tapping detection unit of the configuration example III of the embodiment.

It is sufficient that the energy increase/decrease determination process of the determination processing unit 55 in this case is performed as in, for example, FIG. 12.

In FIG. 12, the processes that are the same as those of FIG. 7 above are designated with the same step numbers, and duplicated descriptions thereof are omitted.

In the process of FIG. 12, the detection of a first tapping is performed in steps F101 to F106. Furthermore, in steps F107 to F110, the time period from the first tapping until a second tapping is monitored. The above is similar to that of FIG. 7.

If there is an increase in the energy level of the signal S that is expected to be determined to be a second tapping in step F110, the determination processing unit 55 makes an L/R determination in step F130.

For this, a determination is made as to whether the signal from the low-pass filter 58 of FIG. 11 is positive or negative at this point in time. In the case of a configuration in which the absolute value-converted signal of the R channel is subtracted from the absolute value-converted signal of the L channel in the subtractor 57 as in FIG. 11, if the signal from the low-pass filter 58 is positive, the channel is determined to be an L channel, and if the signal is negative, the channel is determined to be an R channel.

That is, this L/R determination is a process for detecting which one of the mics 12L and 12R has been tapped.

Next, the determination processing unit 55 performs a confirmation process for confirming the tapping is a second tapping in steps F111 to F114 in the same manner as in the case of FIG. 7.

Then, if a decrease of the energy level of the signal S within the second time period THtm2 is detected in step F114, it is determined in step F115A that the second tapping has been performed.

At this time, the determination processing unit 55 outputs the operation detection signal SdetL and the determination signal D-LR of the L/R channel to the control unit 38. The determination signal D-LR is generated on the basis of the P determination process in step F130.

In the case of the configuration example III, the control unit 38 is able to recognize two types of operation inputs in which the mics 12L and 12R are used separately in accordance with the operation detection signal Sdet and the determination signal D-LR, and is able to control, for example, volume up/down in accordance with those signals.

Therefore, on the basis of the configuration example III, it is possible to separately perform two types of operations using the right and left mics 12L and 12R, which improves usability of the user. Moreover, the burden caused by the configuration of the tapping detection unit 37 can be decreased when compared with the case of the configuration example II. In particular, because only one determination processing unit 55 is necessary, a processing (resource) burden can be reduced.

In place of the subtractor 59, an adder is considered to be used.

2-5: Modification of Processing of Tapping Detection Unit]

Up to this point, examples have been given as regards to the examples of the configuration and the examples of the energy increase/decrease determination process of the tapping detection unit 37. More various examples are considered as modifications of the embodiment.

In each of the above-described examples, an example in which a double tapping is made to be a certain operation is given. However, of course, only the first tapping may be recognized as an operation.

For example, in that case, when the process proceeds to step F106 of FIG. 7, the determination processing unit 55 may determine the tapping to be an operation of the user and may output an operation detection signal Sdet.

Furthermore, a triple tapping rather than a double tapping, that is, three continuous taps, may be recognized as an operation input.

Figure 13:
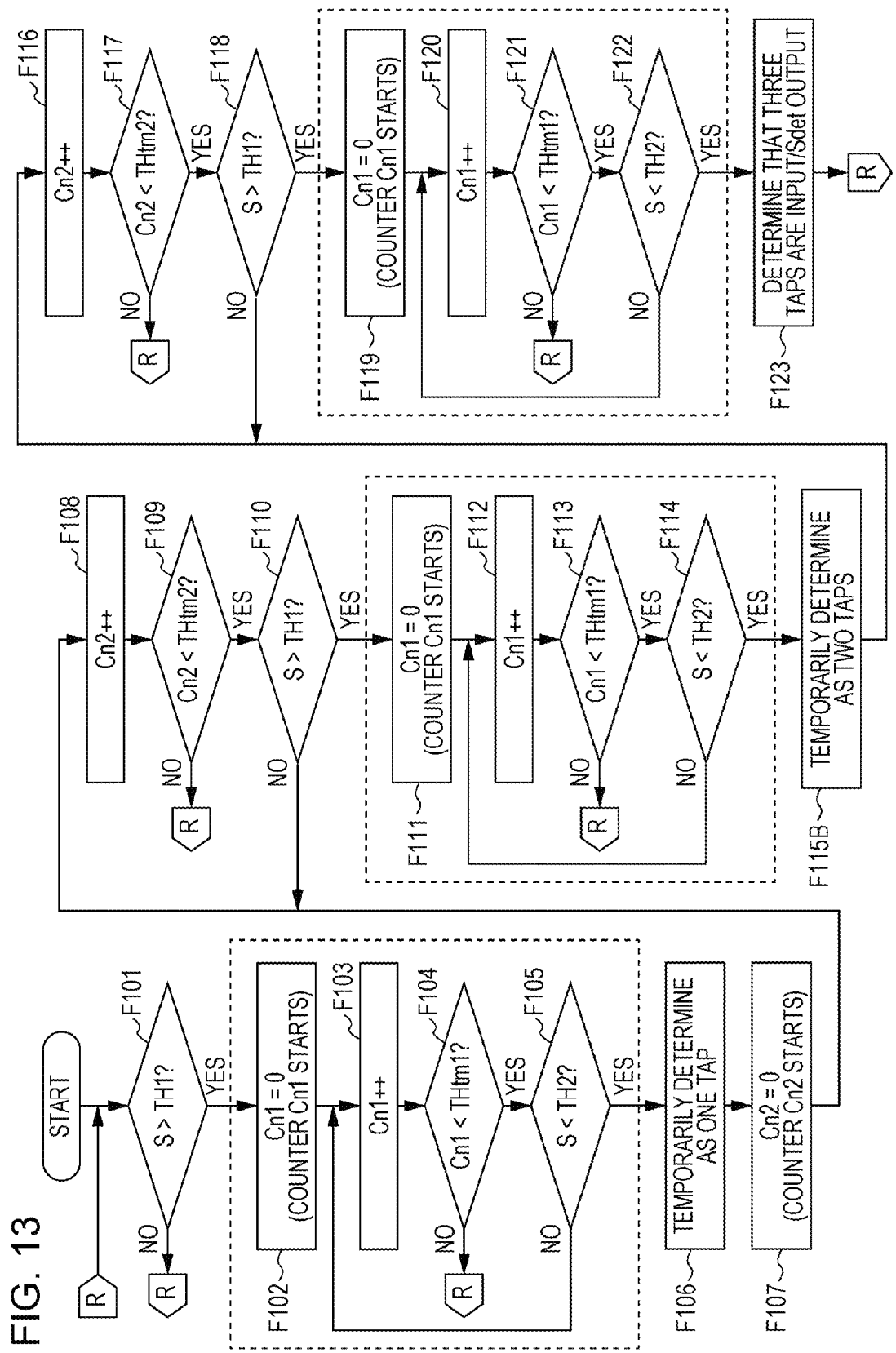
FIG. 13 is a flowchart in the case of three tapping determination of the embodiment.

The energy increase/decrease determination process in this case is performed as in, for example, FIG. 13.

The processes in FIG. 13, which are the same as those in FIG. 7, are designated with the same reference numerals, and detailed descriptions thereof are omitted.

In FIG. 13, steps F101 to F114 are the same as in FIG. 7. Therefore, in a case where it is detected in step F114 that the signal S has decreased to less than the threshold value TH2, this is a case in which it is determined that the second tapping has been performed. Accordingly, the determination processing unit 55 proceeds to step F115B, whereby it is temporarily determined that the second tapping that is estimated to be a user operation has occurred.

Then, while the determination processing unit 55 increments the counter Cn2 in step F116, the determination processing unit 55 performs the determination of steps F117 and F118.

In step F117, the determination processing unit 55 determines whether or not the value of the counter Cn2 has not reached the second time period THtm2.

If the value of the counter Cn2 exceeds the second time period THtm2 in step F117, the process returns to step F101 as indicated by "R". That is, even if the second time period THtm2 is reached, that case is a case in which a third energy level is not detected, and it is determined that three continuous taps as an operation has not been performed.

Furthermore, in step F118, the determination processing unit 55 determines whether or not the signal S has increased to more than the threshold value TH1.

This is a determination process of whether or not an increase in the energy level of the signal S by the third tapping has been observed.

When it is determined in step F118 that the signal S has increased to more than the threshold value TH1, the determination processing unit 55 performs the processes of steps F119 to F122.

Also, in this case, the processes of steps F119 to F122, which are enclosed by the dashed line, are the same as the processes (common routine) of steps F111 to F114 and steps F102 to F105, which are similarly enclosed by the dashed line.

In step F119, first, the determination processing unit 55 resets the counter Cn1 to 0, and starts the counting.

Then, while the determination processing unit 55 increments the counter Cn1 in step F120, the determination processing unit 55 makes determinations of steps F121 and F122.

In step F121, the determination processing unit 55 determines whether or not the value of the counter Cn1 has not reached the first time period THtm1.

The first time period THtm1 is set as a time period for making a determination as to whether or not the energy increase/decrease of the signal S has occurred instantaneously in the manner described above, that is, whether or not the energy increase/decrease is an instantaneous increase/decrease of the energy level due to a tapping operation.

Therefore, when the value of the counter Cn1 exceeds the first time period THtm1 in step F121, the process returns to step F101 as indicated by "R". That is, in that case, it is determined that the tapping is not a tapping as an operation.

Furthermore, in step F122, the determination processing unit 55 determines whether or not the signal S has decreased to less than the threshold value TH2.

When it is determined in step F122 that the signal S has decreased to less than the threshold value TH2, the determination processing unit 55 proceeds to step F123, whereby it is determined that a third tapping as an operation has occurred.

Then, the determination processing unit 55 determines that a triple tapping by the user as a conscious operation has been performed, and outputs an operation detection signal Sdet indicating that an operation has occurred to the control unit 38.

As a result of such processing, it is possible to detect that three taps have been performed within a certain time period, and by recognizing the three taps as an operation input, the control unit 38 can perform a certain control process.

Of course, four or more continuous taps can also be detected as an operation. The processing in that case may be considered by applying the processing of FIG. 13 above.

Furthermore, an operation input formed of a combination of a plurality of taps and pauses can also be detected.

In addition, earlier, an example is shown in which two types of operations can be recognized by each of the taps of the mics 12L and 12R in the configuration examples II and III. Alternatively, a plurality of types of operations can also be recognized on the basis of the number of taps performed.

Figure 14:
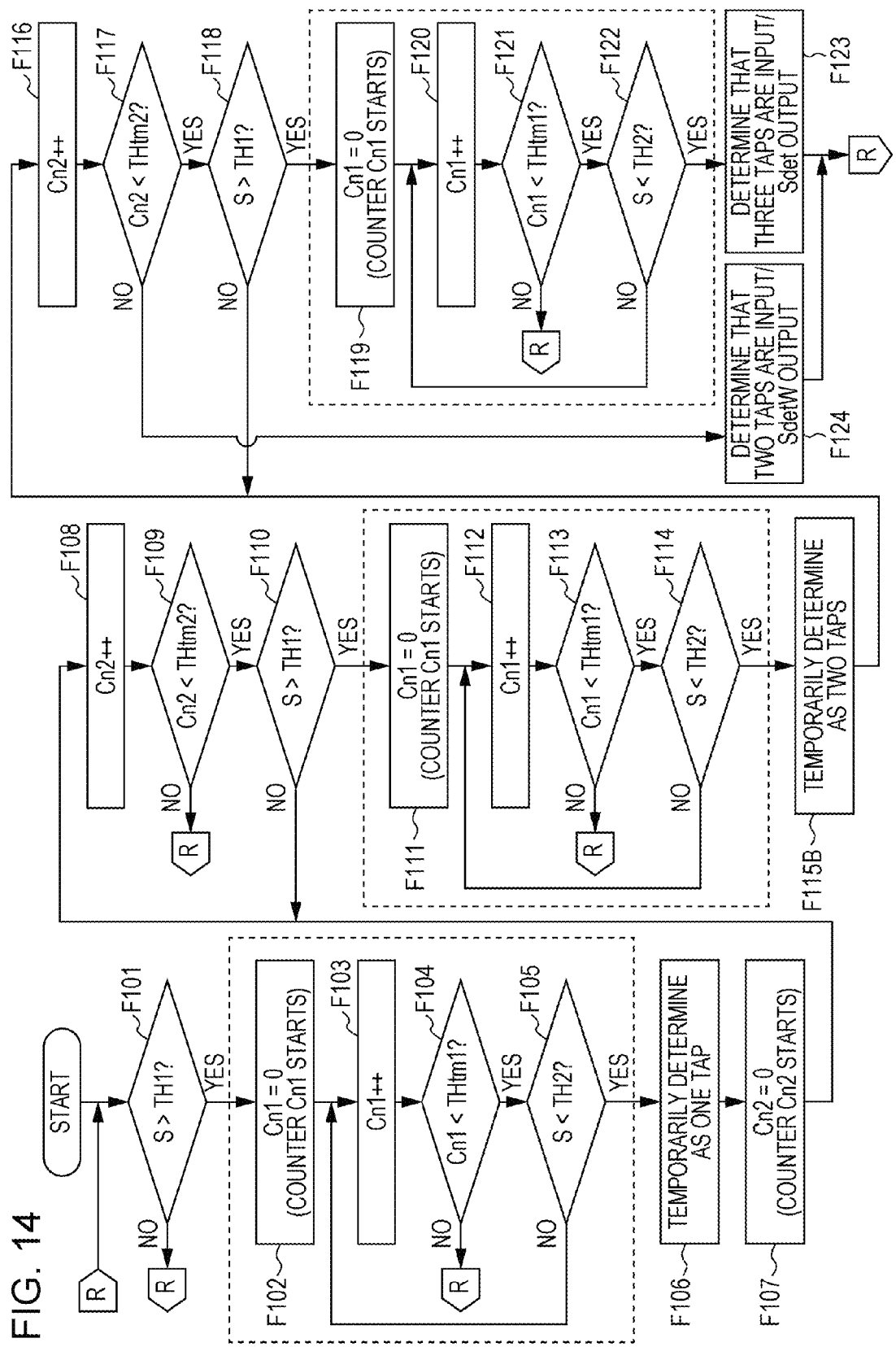
FIG. 14 is a flowchart in the case of two and three tapping determination of the embodiment.

FIG. 14 illustrates an example of processing in which a double tapping and a triple tapping are recognized as different operations.

The processes in FIG. 14, which are the same as those of FIG. 13, are designated with the same reference numerals, and descriptions thereof are omitted.

Steps F101 to F115B are the same as those of FIG. 13.

In a case where it is temporarily determined in step F115B that a second tapping has occurred, similarly to FIG. 13, whether or not a third tapping occurs within the second time period THtm2 is monitored in steps F116 to F118.

Here, in a case where the second time period THtm2 has passed while the third tapping is not detected in step F117, the process is assumed to proceed to step F124.

That is, the determination processing unit 55 determines that the number of taps performed by the user is two, and it is determined in step F124 that the tapping is an operation input by a double tapping operation. Then, an operation detection signal SdetW indicating that a double tapping operation has occurred is output to the control unit 38.

On the other hand, in a case where the third tapping is estimated, the process proceeds from step F118 to step F119, and the processes of steps F119 to F122 are performed in the same manner as in the case of FIG. 13. Then, when the tapping is determined to be a third tapping, the process proceeds to step F123, whereby a triple tapping as an operation is recognized. In this case, the determination processing unit 55 outputs an operation detection signal SdetT indicating that a triple tapping has occurred to the control unit 38.

According to the energy increase/decrease determination process as shown in FIG. 14, the control unit 38 is able to recognize two types of operation inputs in accordance with the operation detection signals SdetW and SdetT, and it is possible to perform a certain control process in accordance with each operation input.

Of course, if a combination with the above-mentioned configuration examples II and III is made, it is possible to recognize four types of operation inputs as a double tapping and a triple tapping of each of the mics 12L and 12R.

It is natural that, furthermore, one tapping or four or more continuous taps may be distinguished and recognized, and furthermore, more various operations may be made possible.

Furthermore, in the present embodiment, as an example of the NC headphone 10, the existing mics 12L and 12R for noise cancellation are used. If many microphones for operation input can be disposed, many types of operation inputs become possible with the microphones.

3. Embodiment Applied to Various Types of Apparatuses

Up to this point, embodiments in which the present invention is applied to the NC headphone 10 have been described. However, the present invention can be applied to a variety of electronic apparatuses. Hereinafter, the examples thereof will be described.

First, in the medium player 20 shown in FIG. 3, it is considered that the audio signal processing unit 1 (the tapping detection unit 2, the control unit 3) shown in FIG. 1 is installed.

That is, the example is a case in which the function of the noise cancellation unit 14 is incorporated in the medium player 20. In this case, the medium player 20 is a specific device in which the audio signal processing unit 1 of the embodiment of the present invention is installed, and the effects that are the same as the effects of the above-mentioned NC headphone 10 can be exhibited.

The mic 4 in that case may be one that is installed in the connected headphone device, or may be a mic device that is separate from the headphone device connected to a mic input terminal. Of course, in a case where a mic is to be incorporated in the main body of the medium player 20, the mic may be used.

Furthermore, also, in an image-capturing device, such as a digital still camera or a video camera, a mic is often installed. By causing such an image-capturing device to be provided with the configuration of FIG. 1, an operation input using a mic becomes possible.

In the case of a game machine, a tapping to the mic 4 can also be used for an operation in the case of a game.

Similarly, the present invention can be applied to a personal computer, a portable information processing device (for example, a PDA (Personal Digital Assistant)), or a mobile phone.

In a case where a mic for audio input is to be provided in these devices, an operation input as a result of tapping the mic becomes possible. By using, for example, a stereo mic for communication installed in a personal computer or a mobile PC, it is possible to recognize an operation by detecting tapping, and it is possible to perform a certain process.

Furthermore, in the case of a mobile phone, a mic is naturally provided. Consequently, the use thereof makes it possible to apply the present invention without incurring a new installation burden of a mic device.

In particular, an apparatus having a mic disposed therein, such as an NC headphone, a medium player, a mobile phone, a mobile PC, or a portable game machine, is often a mobile device having high portability. Thus, it is useful that the disposal of a switch that takes a large area can be omitted.

There is a background that, since the apparatus is a small apparatus, necessarily, the resources of a CPU and a DSP, which are installed in the inside, are limited, and the detection algorithm is preferably lighter.

For this reason, the algorithm of the embodiment in which the above-described energy increase/decrease determination process is performed in the time axis, and tapping detection is performed without performing frequency analysis or the like is more effective.

In addition, the present invention can also be applied to various communication apparatuses, audio visual (AV) apparatuses, household electrical apparatuses and the like.

Furthermore, regarding a tapping operation, it is possible to assign a variety of operations depending on which mic is tapped, the number of taps, the interval between taps, and the like.

Furthermore, regarding a mic, not only a mic used for another audio input function, but also a mic dedicated for a tapping operation input may be provided.

Furthermore, the mic used for the tapping operation may be any of a stereo microphone, a monaural microphone, and a multi-channel microphone.

Furthermore, as the operation content by tapping operations, a variety of examples, such as an operation regarding recording reproduction, an operation regarding transmission and reception, a menu operation, an entry operation, and a power supply on/off operation, are considered.

Furthermore, the mic can also be used to create electronic mail sentences and input characters.

Examples of the creation of electronic mail and the transmission operation will be given.

FIG. 15A illustrates an example in which an earphone speaker 101 having a mic 102 installed therein is connected to the mobile phone 100.

Of course, the mic 102 may be a mic that is installed in the main body of the mobile phone 100.

By tapping the microphone 102, an arbitrary electronic mail document is created and transmitted.

First, a control unit (not shown) in the mobile phone 100 sets in advance, a special code and a select mode, as shown in FIG. 15B.

As a special code, a double tapping within one second is set as an in/out operation of the select mode. Furthermore, a triple tapping within one second is set as an operation for returning to the previous selected item.

For the select mode, the transmission destination select, the text select, and the execution select are provided.

In the transmission destination select mode, a person whose address is registered can be selected as a mail transmission destination. In the text select mode, sentence content can be selected. In the execution select mode, an operation, such as transmission or cancellation, can be selected.

Figure 16:
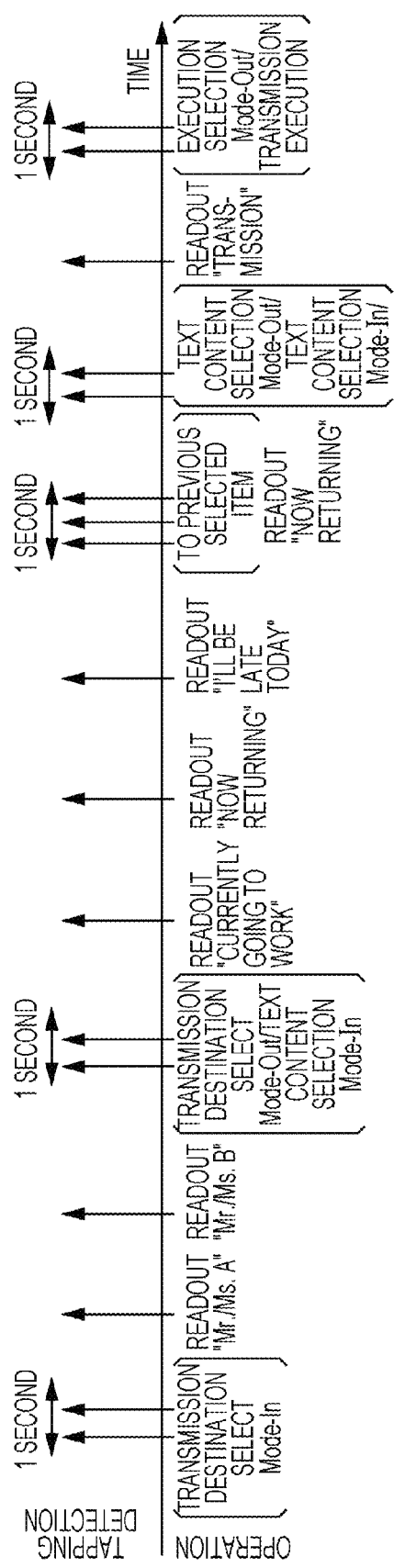
FIG. 16 is an illustration of an example of an electronic mail operation of the embodiment.

FIG. 16 illustrates an example of operations of the creation and transmission of electronic mail.

First, when a double tapping is detected, the control unit of the mobile phone 100 enters into a transmission destination select mode. Then, the name of the person registered as the transmission destination is read out.

The user listens to the name that is read out from a speaker 101, and double taps again at the time when the name of the party to whom a text is to be transmitted this time is read out.

Then, the control unit determines the person who is read out immediately before the double tapping as the transmission destination. In the case of the figure, "Mr./Ms. B" is selected as the transmission destination. Then, the control unit shifts from the transmission destination select mode to the text select mode.

In the text select mode, the control unit performs a process for reading out various texts. It is sufficient that the user listens to the text that is read out from the speaker 101, and double taps again at the time when the text of the content to be transmitted this time is read out.

Furthermore, in a case where the readout content is desired to be returned, it is sufficient that a triple tap be performed.

In the example in the figure, the texts are read out in the order of "currently gong to work", "now returning", "I'll be late today" . . . . Here, if the user wants to select "now returning", but the readout advanced to the next text, the user performs a triple tapping. In response to this, the control unit reads out again the previous text "now returning".

Here, if the user performs a double tapping, the control unit shifts from the text select mode to the execution select mode by assuming that "now returning" is selected.

Even in the execution select mode, the control unit performs a process for reading out execution content. Then, for example, if the user performs a double tap at the time the text is read out as "transmission", the control unit recognizes that "transmission" is selected, ends the execution select mode, and performs a transmission process.

By such a process, an electronic mail document of "now returning" is created for Mr./Ms. B, and is transmitted.

As in this example, by making a determination as to the time of tapping, it is possible to input character codes and a preset sentence. For example, in the case in which there is a mic as in FIG. 15A, it is possible to transmit a fixed phrase by mail in a simplified manner near the ear without chatting inside a train or without taking out a mobile phone/terminal from a bag or the like.

In the example, types of transmission destinations and fixed phrases that are often used by a maker or a user are preset in advance, and furthermore, rules as special codes are determined in advance.

As a result of the above, it is possible to transmit a text comparatively simply, efficiently, and without being easily noticed by a person nearby.

Furthermore, in the example, a readout process is performed at the time of selecting an item. This process is not necessarily necessary, and a confirmation may be performed in the last or middle stage.

Furthermore, the readout of the select item is considered to advance by a single tapping operation.

Of course, a mechanism in which, by using the similar technique, the code of the character itself rather than a fixed phrase is input, and characters are input on a character by character basis by tapping, may be implemented. For example, although not shown in the figure, if one of "a, b, c, d, e . . . " is selected by tapping the left ear, and thereafter the desired level among "a level, b level, . . . " are selected by tapping the right ear, it is possible to comparatively easily input the text.

4. Program

The program of the embodiment of the present invention is a program for causing a computation processing device to perform a tapping detection step and a control step.

The tapping detection step detects a tapping input operation on the basis of an energy increase/decrease determination process for making a determination as to the increase and the decrease of an energy level of the low-frequency components with regard to an audio signal picked up by a microphone that is separately connected within a first time period.

The control step performs a certain control process that is set for the tapping input operation in response to the tapping input operation being detected in the tapping detection step.

As a result of control units (computation processing devices) of various apparatuses described above being operated in accordance with such a program, the audio signal processing apparatus of the present invention is implemented. That is, the processes of FIGS. 2 and 7 (or FIG. 12, FIG. 13, FIG. 14, etc.) are performed.

Such a program can be recorded in advance in an HDD serving as a recording medium that is incorporated in a device, such as a personal computer, or a ROM, a flash memory, etc., in a microcomputer including a CPU.

Alternatively, the program can be stored "recorded" temporarily or permanently on a removable recording medium, such as a flexible disc, a compact disc read only memory (CD-ROM), a magnet optical (MO) disc, a DVD, a Blue-ray disc, a magnetic disc, a semiconductor memory, or a memory card. Such a removable recording medium can be provided as a so-called packaged software.

Furthermore, in addition to being installed from a removable recording medium into a personal computer or the like, the program can be downloaded from a download site through a network, such as a LAN (Local Area Network) or the Internet.

The present application contains subject matter related to that disclosed in Japanese Priority Patent Application JP 2010-088659 filed in the Japan Patent Office on Apr. 7, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An audio signal processing apparatus having noise cancellation function comprising:
   a tapping detection unit comprising at least one first circuit configured to detect a tapping input operation from an audio signal picked up by at least one microphone, wherein detecting the tapping input operation comprises:
      detecting, at a first time, an increase in energy level of one or more components of the audio signal; and
      determining whether a decrease in energy level of the one or more components of the audio signal occurs before an end of a first time period starting at the first time;
   a control unit comprising at least one second circuit configured to, in response to the tapping input operation being detected by the tapping detection unit, perform a control process corresponding to the detected tapping input operation; and
   a noise cancellation unit comprising at least one third circuit configured to generate a noise reduction audio signal, that is in a phase that is acoustically opposite to an external noise, based on an audio signal of the external noise picked up by the at least one microphone.

2. The audio signal processing apparatus of claim 1, wherein the at least one first circuit of the tapping detection unit comprises at least one low-pass filter configured to filter the audio signal picked up by the at least one microphone to obtain the one or more components of the audio signal.

3. The audio signal processing apparatus of claim 2, wherein the tapping input operation comprises a first tap and a second tap, and wherein the at least one first circuit of the tapping detection unit is configured to:
   detect the first tap at a second time; and
   determine whether the second tap occurs before an end of a second time period starting at the second time, the second time period being longer than the first time period.

4. The audio signal processing apparatus of claim 3, wherein:
the at least one microphone comprises a plurality of microphones;
the at least one first circuit of the tapping detection unit is configured to receive a plurality of input audio signals from, respectively, the plurality of microphones; and
the at least one first circuit of the tapping detection unit is configured to combine the plurality of input audio signals to obtain the audio signal picked up by at least one microphone.

5. The audio signal processing apparatus of claim 4, wherein the at least one first circuit of the tapping detection unit is configured to determine from which input audio signal of the plurality of input audio signals the tapping input operation has been detected.

6. The audio signal processing apparatus of claim 3, wherein:
the tapping input operation is a first tapping input operation;
the at least one microphone is a first microphone;
the audio signal picked up by the at least one microphone is a first audio signal;
the at least one first circuit of the tapping detection unit is configured to receive as input the first audio signal and to detect the first tapping input operation from the first audio signal; and
the at least one first circuit of the tapping detection unit is further configured to receive as input a second audio signal picked up by a second microphone different from the first microphone and to detect a second tapping input operation from the second audio signal.

7. The audio signal processing apparatus of claim 1, wherein:
detecting an increase in energy level of one or more components of the audio signal comprises determining whether an energy level of the one or more components of the audio signal exceeds a first threshold value; and
determining whether a decrease in energy level of the one or more components of the audio signal occurs comprises determining whether the energy level of the one or more components of the audio signal drops below a second threshold value, the second threshold value being lower than the first threshold value.

8. An audio signal processing method, for noise cancellation function, comprising:
detecting a tapping input operation from an audio signal picked up by at least one microphone, wherein detecting the tapping input operation comprises:
detecting, at a first time, an increase in energy level of one or more components of the audio signal; and
determining whether a decrease in energy level of the one or more components of the audio signal occurs before an end of a first time period starting at the first time;
in response to the tapping input operation being detected, performing a control process corresponding to the detected tapping input operation; and
generating a noise reduction audio signal, that is in a phase that is acoustically opposite to an external noise, based on an audio signal of the external noise picked up by the at least one microphone.

9. A non-transitory computer readable medium having stored thereon, a set of computer-executable instructions for causing a computer to perform steps, for noise cancellation function, comprising:
detecting a tapping input operation from an audio signal picked up by at least one microphone, wherein detecting the tapping input operation comprises:
detecting, at a first time, an increase in energy level of one or more components of the audio signal; and
determining whether a decrease in energy level of the one or more components of the audio signal occurs before an end of a first time period starting at the first time;
in response to the tapping input operation being detected, performing a control process corresponding to the detected tapping input operation; and
generating a noise reduction audio signal, that is in a phase that is acoustically opposite to an external noise, based on an audio signal of the external noise picked up by the at least one microphone.

10. The audio signal processing apparatus of claim 1, wherein the control unit outputs a control signal for switching between on/off of the noise cancelling function based on the tapping input operation.

11. The audio signal processing apparatus of claim 1, wherein the control unit outputs a control signal for switching between the noise cancelling function and a monitor mode.

12. The audio signal processing method of claim 8, further comprising outputting a control signal for switching between on/off of the noise cancelling function based on the tapping input operation.

13. The audio signal processing method of claim 8, further comprising outputting a control signal for switching between the noise cancelling function and a monitor mode.

14. The non-transitory computer readable medium of claim 9, further comprising outputting a control signal for switching between on/off of the noise cancelling function based on the tapping input operation.

15. The non-transitory computer readable medium of claim 9, further comprising outputting a control signal for switching between the noise cancelling function and a monitor mode.

* * * * *